(12) United States Patent
Doken et al.

(10) Patent No.: US 12,114,164 B2
(45) Date of Patent: Oct. 8, 2024

(54) SYSTEMS AND METHODS FOR DETECTING UNAUTHORIZED BROADBAND INTERNET ACCESS SHARING

(71) Applicant: Rovi Guides, Inc., San Jose, CA (US)

(72) Inventors: Serhad Doken, Bryn Mawr, PA (US); Dhananjay Lal, Englewood, CO (US)

(73) Assignee: ROVI GUIDES, INC., San Jose, CA (US)

(*) Notice: Subject to any disclaimer, the term of this patent is extended or adjusted under 35 U.S.C. 154(b) by 241 days.

(21) Appl. No.: 17/882,793

(22) Filed: Aug. 8, 2022

(65) Prior Publication Data
US 2024/0048989 A1 Feb. 8, 2024

(51) Int. Cl.
| | |
|---|---|
| *H04L 43/106* | (2022.01) |
| *H04L 12/24* | (2006.01) |
| *H04L 12/26* | (2006.01) |
| *H04L 43/08* | (2022.01) |
| *H04L 67/1396* | (2022.01) |
| *H04W 12/121* | (2021.01) |

(52) U.S. Cl.
CPC .......... *H04W 12/121* (2021.01); *H04L 43/08* (2013.01); *H04L 67/1396* (2022.05)

(58) Field of Classification Search
CPC .. H04W 12/121; H04L 67/1396; H04L 43/08; H04L 43/106; H04L 41/32; H04L 12/24; H04L 12/26
USPC ....................................................... 709/228
See application file for complete search history.

(56) References Cited

U.S. PATENT DOCUMENTS

| | | | |
|---|---|---|---|
| 2005/0034159 A1* | 2/2005 | Ophir | H04W 88/08 725/74 |
| 2016/0119193 A1* | 4/2016 | Zhang | H04L 63/0281 709/224 |
| 2016/0198079 A1* | 7/2016 | Shishalov | H04N 23/66 348/159 |

OTHER PUBLICATIONS

"Bad idea—sharing Internet with neighbors in apartment?," May 25, 2016 (14 pages) (https://forum.mrmoneymustache.com/ask-a-mustachian/bad-idea-sharing-internet-with-neighbors-in-apartment/.
Mr. Money Mustache, "Internet Sharing—How to Get Revenge on the Cable Company" May 16, 2012 (28 pages) (https://www.mrmoneymustache.com/2012/05/16/internet-sharing-how-to-get-revenge-on-the-cable-company/).

* cited by examiner

*Primary Examiner* — Jude Jean Gilles
(74) *Attorney, Agent, or Firm* — HALEY GUILIANO LLP

(57) ABSTRACT

Data describing broadband internet usage is collected from a user equipment device associated with each respective user account. The data are then input into a machine learning model that is trained on broadband internet usage data of a plurality of user accounts in a single geographic area. An n-dimensional metric for each user account is then obtained as output from the machine learning model. Using the n-dimensional metric, at least one candidate user account suspected of being engaged in broadband internet access sharing is identified, and a list of candidate user accounts is generated.

24 Claims, 12 Drawing Sheets

SYSTEMS AND METHODS FOR DETECTING UNAUTHORIZED BROADBAND INTERNET ACCESS SHARING

BACKGROUND

This disclosure is directed to detecting broadband internet access sharing. In particular, techniques are disclosed for identifying, using machine learning, user accounts suspected of being engaged in broadband internet access sharing and using data gathered from each user account to reduce false positives.

SUMMARY

Broadband service providers lose significant revenue each year when subscribers share wireless passwords. One user subscribes to the internet service, paying for a certain bandwidth tier, and provides their Wi-Fi password to neighbors. The subscriber and the neighbors develop an informal relationship to share the internet bill. This is more prevalent in dense urban areas: several apartments in a multi-dwelling unit (MDU) can share Wi-Fi through informal arrangements between tenants. The use of previous generation Wi-Fi repeaters and improved Wi-Fi Mesh technology helps extend Wi-Fi range, increasing risk of revenue loss for internet service providers.

Broadband providers not having taken much action against this does not mean that they never will. Netflix, as a streaming video on-demand service, did decide to take action against account password sharing, when its revenue growth stalled. In the past, broadband accounts were a growing market, which may explain the lack of action. However recently, growth has stalled due to declining household formation and losing accounts may prompt the ISPs to crack down on Wi-Fi sharing. Moreover, with other upcoming Fixed Wireless Access (FWA) deployments, there will be more competition for broadband customers (versus cable companies mostly having a monopoly in the past in a particular geographical region) due to 5G FWA (licensed millimeter wave (mmW) deployments using 28 or 39 GHz) between telecommunication (telco) companies, cable companies and other newcomers (such as Starry using unlicensed mmW deployments at 60 GHz). T-Mobile has already announced that they have surpassed one million cellular backhauled broadband customers. AT&T and especially Verizon aim to deploy FWA within urban and large metropolitan areas where the population density is high. Verizon has publicly stated that they are treating thirty million homes as potential new 5G FWA customers. These developments will make Wi-Fi sharing even more important issue because sharing within metro areas may translate into significant revenue leaks for ISPs (cable and telco companies).

Beyond the revenue leak, there is also the threat of Wi-Fi password crack issue. There are variety of tools that are available in the market that can help one to gain access to someone else's Wi-Fi password. Consumers will be at risk if someone cracks their Wi-Fi password and shares the connection to steal their bank account credentials, use their network to launch cyber-attacks, access illicit and/or explicit websites, and many other malicious activities. It is not surprising to expect that operators may offer services to detect Wi-Fi sharing and monetize this as a protective/preventative consumer service.

This disclosure provides methods and systems for detecting unauthorized sharing of broadband internet access. A service provider maintains a table/record of usage data for all its subscriber accounts. Values are measured and updated at periodic intervals, typically at a wired or wireless internet gateway device, modem, or router that is connected to the gateway device or modem. A typical value of this time interval T may be 24 hours. The values measured may include the total number of bits downloaded in time interval T (downstream tonnage), the total number of bits uploaded in time interval T (upstream tonnage), peak (instantaneous) downstream bandwidth in time interval T, peak (instantaneous) upstream bandwidth in time interval T, downstream wide area network (WAN) link utilization (proportion of time that the downstream WAN link is activated during time interval T), and a difference in number of browser based ads served in two successive, though not necessarily temporally adjacent, time intervals T.

The service provider also has each subscriber's address in its account data, and it uses an "out-of-band" means to derive the following information about each subscriber account, including home size, proportion of neighboring household passings (i.e., a household to which a WAN connection exists but is not currently activated) served by the service provider, and whether any neighboring account was deactivated in the last thirty days.

Systems and methods are described herein for identifying user accounts engaged in broadband internet access sharing. Data describing broadband internet usage is collected from a user equipment device associated with each respective user account. The data are then input into a machine learning model that is trained on broadband internet usage data of a plurality of user accounts in a single geographic area. An n-dimensional metric for each user account is then obtained as output from the machine learning model. Using the n-dimensional metric, at least one candidate user account suspected of being engaged in broadband internet access sharing is identified, and a list of candidate user accounts is generated.

Data may be collected from a user equipment device by measuring at least one broadband usage metric at two different times. A difference between the at least one metric at a first time and at a second time can then be determined. The broadband usage metric may, for example, be any one or more of total number of bits downloaded, total number of bits uploaded, peak downstream bandwidth, peak upstream bandwidth, downstream wide-area network link utilization, and number of browser-based ads served.

The machine learning model may output a number of false positive candidate user accounts. There are several ways to narrow the list of candidate user accounts to reduce the number of false positives included. For example, a number of devices connected, via Wi-Fi, to the user equipment device associated with an account is determined and compared to a threshold number of devices. If the number of devices is lower than the threshold, the user account is less likely to be engaged in broadband internet access sharing, and the user account is removed from the list of candidate user accounts.

Another method for narrowing the list of candidate user accounts is based on signal strength of each device connected, via Wi-Fi, to the user equipment device. Devices connected, via Wi-Fi, are identified and the signal strength of each device is determined at a first time. For example, the user equipment device may report the signal strength of each device, or a request may be transmitted to each device to cause each device to report its signal strength. A subset of devices having a signal strength below a threshold is then identified. The signal strength detection process is repeated at a second time, and the signal strength of each device is compared to its respective signal strength at the first time. Based on the comparison, it is determined whether the signal strength has changed by more than a threshold amount. If the signal strength has changed by more than the threshold amount, the signal strength is compared to the threshold signal strength to determine if it has risen above the threshold signal strength. If so, the device is removed from the subset of devices. If all devices are removed from the subset of devices, then the user account is removed from the list of candidate user accounts suspected of being engaged in broadband internet access sharing.

If the signal strength of a device has not changed by more than the threshold amount, a map of at least a portion of a building associated with the user account is generated and a location of the device is determined. If the location of the device has changed by more than a threshold amount while maintaining the low signal strength, then it is likely that, despite having a low signal strength, the device is located within the portion of the building associated with the user account and is therefore an authorized device. The device is then removed from the subset of devices. If, however, the location of the device has changed by more than a threshold amount and the signal strength of the device has fallen even lower, or the connection was temporarily lost, then the device is likely located in a separate dwelling unit from that associated with the user account and is therefore an unauthorized device.

In some cases, it is determined that a range extender is connected to the user equipment device. The range extender is momentarily deactivated during the second time. The signal strength of each device connected, via Wi-Fi, to the user equipment device can then be compared to the signal strength of each device when the range extender is active.

The list of candidate user accounts can also be narrowed based on other network connections made by devices connected to the user equipment. Devices connected, via Wi-Fi, to the user equipment are identified and a subset of devices having low signal strength is determined. It is then determined, for each device, whether the device has connected to a network to which access is restricted to subscribers by the service provider. For example, an internet service provider may maintain a mobile data network. Access to the mobile data network may require a username and/or password associated with a subscriber account. If the device has connected to the restricted access network, the device is removed from the subset of devices. If all devices are removed from the subset of devices, then the user account is removed from the list of candidate user accounts suspected of being engaged in broadband internet access sharing.

Yet another method for narrowing the list of candidate user accounts is based on device authorization. Of the devices connected, via Wi-Fi, to a user equipment device, a subset of devices suspected of being engaged in broadband internet access sharing are identified. This may be through any of the methods discussed above. For each suspected device, a request for authorization (e.g., a password) is transmitted to the device. If a valid authorization is received, the device is removed from the subset of devices. If all devices are removed from the subset of devices, then the user account is removed from the list of candidate user accounts.

An additional method for narrowing the list of candidate user accounts is based on a time at which each device first connected to the user equipment. A plurality of devices connected to the user equipment are identified. For each device, a first connection time corresponding to the earliest time at which the device connected, for the first time, to the user equipment device is determined. A device having the earliest first connection time is identified, and the first connection time of each other device is compared with the first connection time of the device having the earliest first connection time. If the first connection time of a device is within a threshold amount of time of the first connection time of the device having the earliest first connection time, the device is removed from the plurality of devices. If all devices have been removed from the plurality of devices, then the user account is removed from the list of candidate user accounts suspected of being engaged in broadband internet access sharing.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
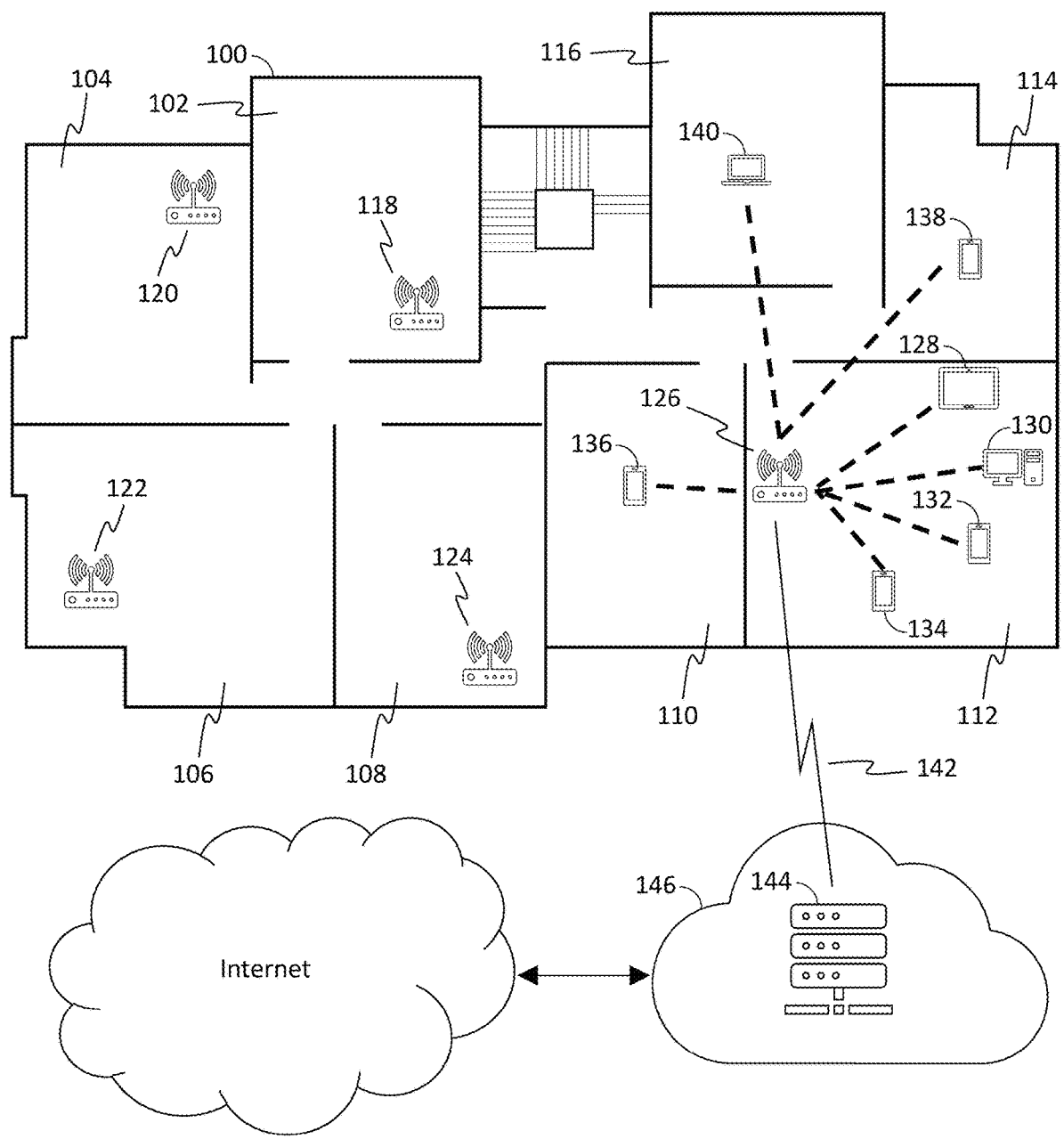
FIG. 1 shows a schematic of a multi-dwelling unit in which some individual dwelling units are occupied by broadband access subscribers and some are not, in accordance with some embodiments of the disclosure.

A first method described herein may apply when a subscriber has subscribed to broadband (internet) service from the service provider but may or may not have taken the service provider's managed router (i.e., may have deployed their own router and/or Wi-Fi access points in the premises). For each element in the usage data record, the service provider calculates the difference between the values for the two most recent time periods. The service provider then augments the data set generated with the data set derived from the subscriber's home address. Thus, for each subscriber, the service provider has the following data, which is fed into a machine learning engine: the difference in the total number of bits downloaded in two successive time intervals; the difference in the total number of bits uploaded in two successive time intervals; the difference in peak downstream bandwidth in two successive time intervals; the difference in peak upstream bandwidth in two successive time intervals; the difference in downstream WAN link utilization in two successive time intervals; the difference in the number of browser based ads served in two successive time intervals; home size; proportion of neighboring household passings served; and whether any neighboring account was deactivated in the last thirty days. As used herein, successive time intervals may be two temporally separate time intervals having no overlap in time. However, the successive time intervals need not be temporally adjacent to each other.

Initially, the service provider has little or no labeled data, and so uses an unsupervised learning technique. The service provider builds its data set from neighborhoods or areas where it suspects that the greatest number of subscriber accounts are engaging in broadband access sharing (e.g., via Wi-Fi password sharing), for instance, subscriber accounts in MDUs. This helps ensure the maximum likelihood of developing a "balanced dataset." The service provider prunes the dataset to achieve balance. The resulting data may have high dimensionality, so methods like Linear Discriminant Analysis (LDA), least absolute shrinkage and selection operator (LASSO), Locally Linear Embedding (LLE), Principal Component Analysis (PCA), Independent Principal Component Analysis (ICA), and Multidimensional Scale Transformation (MDS), are employed to process data to reduce dimensionality. Finally, to account for the difference in scales of the various features (inputs), the data is normalized to create the machine learning model. Various unsupervised learning methods have been documented in the literature. A clustering or anomaly detection method may be employed here. If clustering methods are employed, then outliers or outlier clusters will be identified. The outlier accounts are marked as suspected accounts and tested using an "out-of-band" means (e.g., customer outreach, or engaging a third party) as candidate accounts that have higher likelihood of password sharing. The machine learning engine will recompute its output every time interval T. Once the predictive model has been created, any subscriber account can be tested for broadband access sharing.

If the service provider has a means to determine with certainty through the "out-of-band" means that Wi-Fi sharing has occurred, then the service provider can begin to use hybrid unsupervised-supervised machine learning to determine candidate subscriber accounts most likely to have engaged in Wi-Fi sharing. The service provider attaches a "ground truth" True/False label to each data point that is verified against Wi-Fi sharing based on the final determination. In the hybrid technique, the unsupervised component of the machine learning method separates the data into clusters and outliers, while the supervised learning component helps assign labels to them, improving the identification accuracy of customer accounts that have engaged in Wi-Fi sharing. The True/False label of one or few "ground" truth data points can be assigned to an entire cluster in a hybrid unsupervised-supervised machine learning technique.

The service provider may, over a period of time, accumulate a large enough labeled data set, i.e., a data set in which it is known whether a customer engaged in Wi-Fi sharing or not through True/False labels together with associated data records. At this stage, the service provider may migrate their machine learning technique to a supervised learning method.

Other methods may apply when the subscriber uses a router supplied by the service provider. The service provider may have the ability to collect data about Wi-Fi signal strengths related to specific devices associated with the user account. The service provider may maintain or periodically generate a suspected account list. The suspected account list may be maintained by the operator's subscriber management module in their network. For each account, the service provider may further maintain or periodically generate a suspicious device list. The suspicious device list may also be maintained by the subscriber management module. The methods described below are then triggered when the ratio of suspicious device to the total number of connected devices exceeds a trigger threshold. The trigger threshold is a percentage number that the operator determines based on the type of account. The operator or service provider will only run further analysis to progress to next steps to detect Wi-Fi sharing if it thinks that this particular account has a high percentage of suspicious devices (devices suspected of not belonging to the account owner). If the suspicious device list contains only one or two devices (could be a desktop in a basement), operator will skip the rest of the steps of the algorithm disclosed below. However, if the list of suspicious devices is, for example, 20-30% of the total devices, the service provider will proceed with the methods below. This trigger percentage number can be determined differently by the operator if the account owner resides at an MDU, apartment complex, condo, or single-family house or simply based on the square footage of the home. The reason for this trigger is not to employ all methods at once which may be perceived as annoying or considered overzealous by the account owner and may also conserve network and system resources. It also enables the service provider to eliminate most of the false positive cases.

Note that while these methods are separately disclosed, they may be implemented in a cascading fashion, especially when the service provider limits the set of outliers that are suspected of Wi-Fi sharing. For the outlier accounts, a customer premises deployed router will employ a Wi-Fi sensing method to build a dynamic map of the residence with respect to routers/APs, repeaters, and client devices. This map will be used by the router collecting a time series received signal strength indicator (RSSI) and channel state information (CSI) measurements on its own, via its Rx/Tx antennas as well as by measurements reported by the client devices. The router will be determining home/wall boundaries based on signal reflecting, bouncing and fading characteristics. Details of the processing of that data (methods such as down sampling, frequency domain analysis, logical regression, etc.) are known and are therefore not discussed in detail here. This method leverages a 3D CSI matrix of values representing the amplitude attenuation and phase shift of multi-path Wi-Fi channels. Using this data and residence map, the router will start marking suspected devices that do not seem to be within the boundaries of the residence. Over time, using the machine learning techniques discussed above, the router will strengthen its judgement about certain client devices whether they belong to this residence or not. For outliers (i.e., candidate devices suspected of sharing the Wi-Fi that are downloading/uploading, traffic may be cut off (after a sufficient probation method) by adding them to a blacklist on the router (optionally recording their MAC addresses) either via their device name or IP address. Other than completely blocking WAN access, alternate probation methods may be employed for suspicious devices such as reducing the uplink and/or downlink speed (throttling), increasing latency, preventing access to frequently accessed destinations (based on historical patterns), alternating access/block during short time intervals, and shutting down reception (Rx) or transmission (Tx) channels (alternating during random time intervals). The service provider may choose to issue a warning to the account owner (e.g., via an application or website associated with their subscription) that the access by the suspicious devices has been suspended due to suspected access sharing.

Rather than build a full map of the house or building, a lightweight variation of the method above can be used. RSSI measurements are collected from client devices connected to the router. RSSI values are unscaled values read from a register and can be converted to signal strength values as measured in dBm. A histogram may then be used to identify devices that have consistently low signal strength (e.g., −90 dBm to −60 dBm). It is then determined whether any of these devices have moved. If they are moved, then the signal strength sometimes increases (e.g., to −30 dBm). This makes it more likely that the devices are within the residence, and so they are excluded from the list. If they are moved but their signal strength remains the same or further decreases, it is more likely that the devices are from a neighbor or adjacent unit, and such devices are added to the suspicious devices list. For the remaining devices, it is determined whether they are static devices (i.e., stationary) and are more likely installed just outside the home (e.g., wireless surveillance cameras, smart doorbells, etc.) by inspecting the traffic they generate. For example, a wireless camera will not be accessing video streaming services (e.g., Netflix, YouTube, etc.). These devices can therefore be excluded from the suspicious devices list. Similarly, a laptop that is temporarily taken outside the home will not be there for extended periods and hence may be removed from the suspicious devices list.

Range extenders and IEEE 802.11ax deployment make it more difficult to identify suspicious devices. IEEE 802.11ax is just getting rolled out and despite its small footprint today, it is expected that within the next 5-7 years it will be the dominant Wi-Fi standard that will be used by operators. In fact, several operators have already started upgrading their user equipment devices with 802.11ax support. Most devices will therefore enjoy increased signal strength. Since 802.11ax offers extended range and mesh capabilities, variations to the disclosed method can be used to identify suspicious devices that are sharing the Wi-Fi network. For a short amount of time (e.g., one second), range extender functionality can be disabled. Alternatively, the 6 GHz transmission channel used by the range extender can be turned off. While the range extender functionality is disabled, the distance from the main router to each of the suspected devices can be determined based on signal strength data using the Free Space Path Loss formula:

$$\text{FSPL(dBm)} = 20 \log_{10} d + 20 \log_{10} f + K \qquad \text{Eq. 1}$$

In this equation, FSPL(dBm) is the absolute value of the signal strength, d represents the distance between the device and the router, f represents the signal frequency in MHz, and K is a constant that differs based on the units used for distance and frequency. If the distance is to be measured in meters, and the frequency is measured in MHz, then the value of K is −27.55. To solve for distance in meters, this equation can be rearranged as follows:

$$d = 10^{\frac{dBm - K - 20 \log_{10} f}{20}} \qquad \text{Eq. 2}$$

Thus, for example, for a signal strength of −57 dBm on a Wi-Fi frequency of 2412 MHz, the distance between the router and the device is calculated to be 7.0004 meters. Given that the home size is known, the service provider can check if the computed distance is larger than width, length, and hypotenuse of the residence and issue a judgement as to whether this suspected device is within the boundaries of the residence or not. This algorithm uses heuristics based on historical dBm data from the suspicious devices, since the computed distance may not be totally accurate due to fading signal resulting from passing humans or furniture in the home.

Many cable operators and ISPs also offer cellular services as mobile virtual network operators (MVNOs). If the account owner is also an MVNO customer, yet another method to detect Wi-Fi sharing is whether "suspected mobile devices" are falling back to the MVNO cellular service if the Wi-Fi access are interrupted momentarily. This switch over can be monitored at the ISP, and mobile devices that never switch over to the MVNO service can be marked as suspicious. Once a suspicious mobile device is detected, the operator can apply more scrutiny to the account and analyze other suspicious devices activity in detail (using methods described above).

Another method to detect Wi-Fi sharing uses continual authentication techniques. Despite an account owner sharing the simple Wi-Fi password, other account specific information that only the account/residence owner has access to will be queried on suspected list of devices to ensure that particular device on the network is actually a device that belongs to the account owner. A randomly changed series of questions is sent to suspected devices. One basic example of that is asking for the router password on the suspected device. It is much less likely that account owner will share their router administrative password (not the passkey associated with the SSID) in addition to the Wi-Fi password with a neighbor/freeloader, due to security concerns. Note that these questions can be pushed through the router at the residence via the machine learning algorithms running at the subscriber management module that is on the ISP backend (e.g., cable headend) side. It is expected that when attestation questions continually (but at random times during the day) are pushed to the account owner about the suspected devices (or on the suspected devices), it will create annoyance on the account owner side that will act as a deterrent and possibly terminate the Wi-Fi sharing practice. The unauthorized user will also get tired of trying to guess the answers to the attestation questions and access to his/her device being suspended upon failure to answer correctly.

Suspected devices will be presented a challenge question to enter the name of a device on the network (or their MAC address or what channel they are using such as 2.4, 5 or 6 GHz). If they cannot answer the question or answer incorrectly, their access will be suspended. A variety of other multiple choice challenge questions could be used, such as a last bill amount, a last bill payment date, specific service details related to account bundles, whether a specific video channel or service is subscribed to by the account owner, last on-site service details, last customer service call details, parental profile name, and device model name. Personally identifiable information is not included in the challenge questions. Main account owner devices that are not on the suspected devices list may occasionally be presented questions about the devices from the suspected devices list to confirm whether they want to allow access to each device that the operator suspects is sharing the Wi-Fi password. This would serve as a deterrent against the account owner as not to implicate themselves, by continually having to approve suspected devices' access.

Most routers are theoretically capable of supporting four thousand square feet of coverage area. As a lightweight solution, if the operator strongly suspects that Wi-Fi sharing is enabled by the account owner, despite warnings, it can take control of the main router and adjust its transmission power and antenna gain to surgically fit the coverage area with respect to main account owner residence size. In order to ensure that these parameters are not tinkered with, the operator may limit the usage of these parameters to only itself and not the account owner. In another embodiment, using beam steering, multiple-in multiple-out (MIMO) Rx/Tx antennas are trained to provide the most coverage to devices that are in the clean list and electronically steer the signal away from devices that are in the suspicious list.

FIG. 1 shows a schematic of one level of a multi-dwelling unit in which some individual dwelling units are occupied by broadband access subscribers and some are not, in accordance with some embodiments of the disclosure. Multi-dwelling unit level 100 includes a number of individual dwelling units (e.g., apartments) 102-116. Several units are subscribers to a broadband internet service provider. A resident or occupant of unit 102 is a subscriber and has router 118 installed within unit 102 to connect to the internet via a network provided by the ISP. Units 104, 106, 108, and 112 similarly have routers 120, 122, 124, 126, respectively, installed to connect to the internet via the network provided by the ISP. However, the occupants of units 110, 114, and 116 are not subscribers of the ISP and therefore do not have their own router or other user equipment device through which to connect to the internet. The occupant of unit 112 may be sharing their broadband internet access with the occupants of units 110, 114, and 116. Thus, devices 128, 130, 132, and 134 belonging to the occupant(s) of unit 112, as well as devices 136, 138, and 140 belonging to the occupants of units 110, 114, and 116, respectively, connect to the internet through router 126. For example, each of devices 128-140 communicates with router 126, which relays information through connection 142 to service provider equipment 144 in a service provider network 146. Service provider equipment 144 communicates with the internet and relays requests from user devices to their destination servers and responses to those requests back to their originating user devices.

Using connection 142, service provider equipment 144 can retrieve, monitor, or otherwise obtain usage data from router 126. Similar connections (not shown) are used with routers 118-124 as well. Service provider equipment 144 may input the usage data obtained from router 126 into a machine learning model trained on usage data for a single geographic region to determine whether the account associated with router 126 is engaged in broadband internet access sharing. For example, user accounts in the same region, or even the same neighborhood, may exhibit the same or similar usage patterns. If the output of the machine learning model indicates that the account associated with router 126 is suspected of being engaged in broadband internet access sharing, service provider equipment 144 may use any one or more of the methods described above to determine if the indication is a false positive, or if the account is really engaged in access sharing. Illustrative, non-limiting examples of these processes are described further below in connections with FIGS. 5-12.

Figure 2:
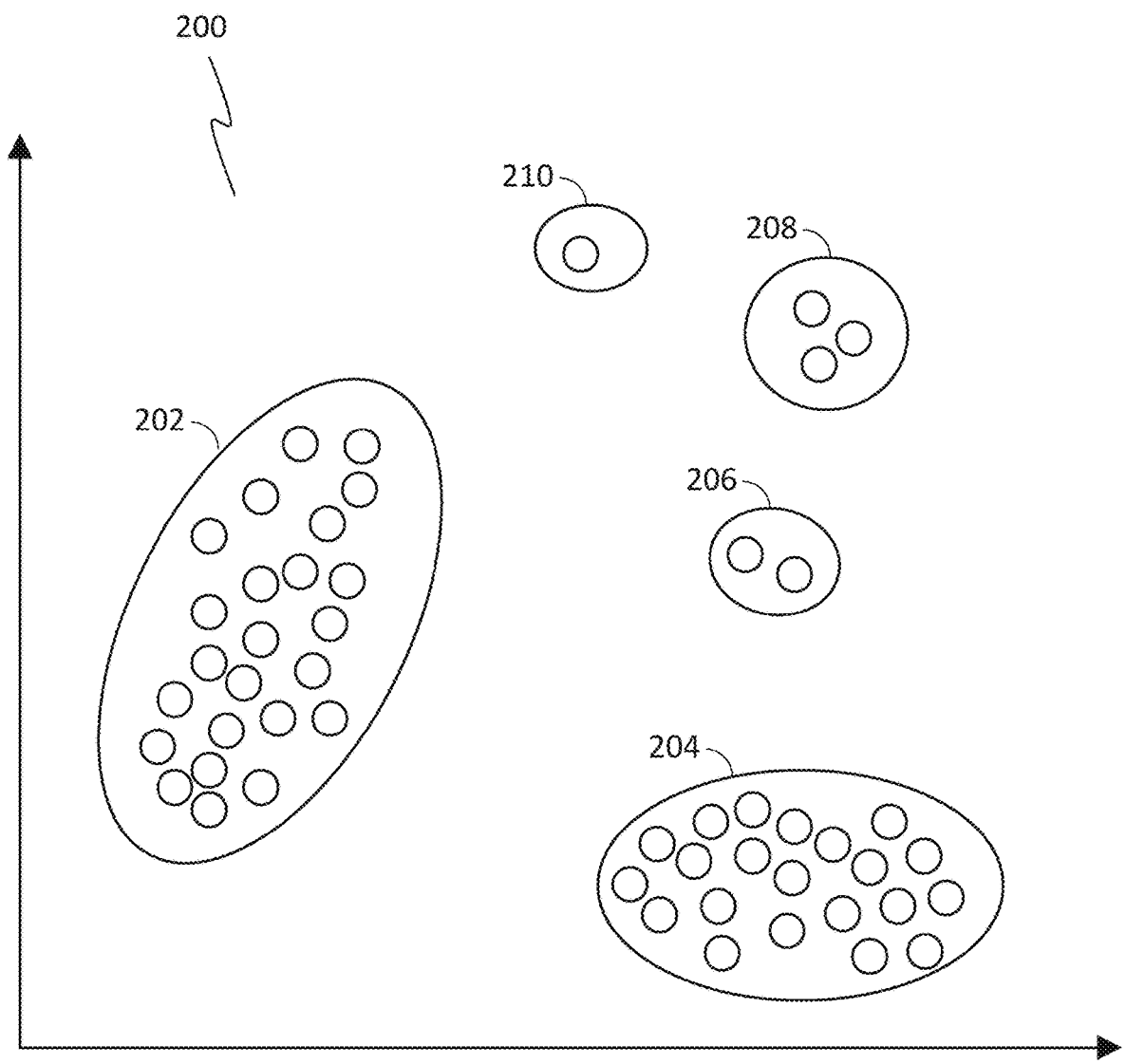
FIG. 2 shows a plot of user accounts based on broadband usage factors in which outlier user accounts are suspected of being engaged in broadband internet access sharing, in accordance with some embodiments of the disclosure.

FIG. 2 shows a plot of user accounts based on broadband usage factors in which outlier user accounts are suspected of being engaged in broadband internet access sharing, in accordance with some embodiments of the disclosure. The output of the machine learning model may be a multi-dimensional metric for each user account. The metric may include dimensions describing a number of bits uploaded, a number of bits downloaded, upload bandwidth, download bandwidth, WAN link usage, etc. User accounts that are behaving normally (i.e., not engaging in access sharing) will generally be clustered into one or more groups. Graph 200 is an illustrative example of such clustering. One group of user accounts may form cluster 202 while another group of accounts may form cluster 204. User accounts whose metrics place them alone (210) or in small groups (206 and 208) are outliers and are therefore suspected of being engaged in access sharing. It is noted that while graph 200 is a two-dimensional plot of user accounts, any number of dimensions can be used.

Figure 3:
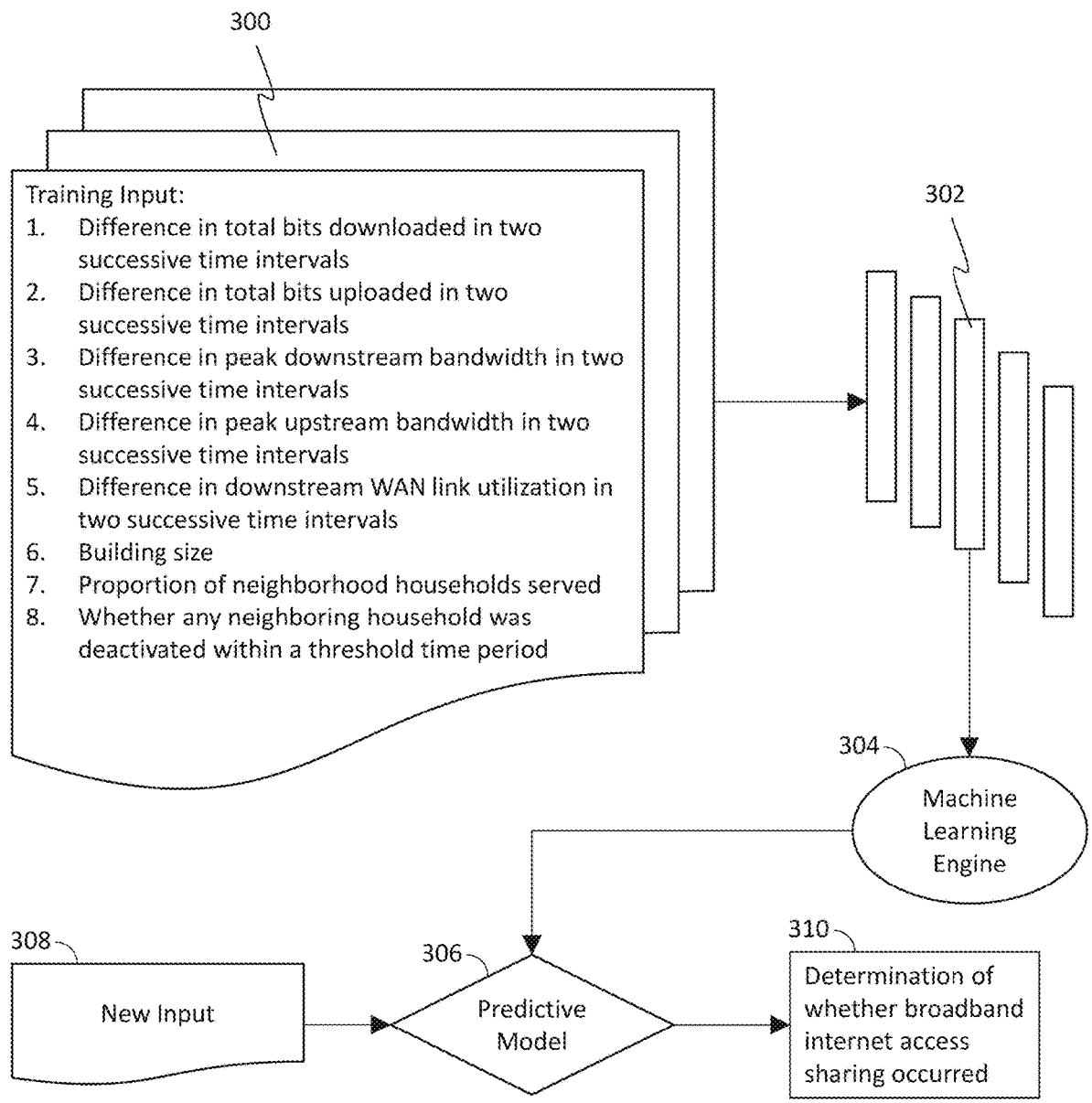
FIG. 3 is a diagram showing generation of a predictive model using a machine learning engine and use of the predictive model to determine whether a user account is engaged in broadband internet access sharing, in accordance with some embodiments of the disclosure.

FIG. 3 is a diagram showing generation of a predictive model using a machine learning engine and use of the predictive model to determine whether a user account is engaged in broadband internet access sharing, in accordance with some embodiments of the disclosure. Training input 300 includes a number of data points collected from each user equipment device. These data points include the total bits downloaded, the total bits uploaded, peak downstream bandwidth, peak upstream bandwidth, WAN link utilization, size of the building or portion of the building associated with the user account, proportion of neighborhood households served (either by the service provider or by any service provider), and whether an account associated with any neighboring household was deactivated within a period of time (e.g., thirty days). For the usage-related data points (bits uploaded or downloaded, peak bandwidth, etc.), the data points may represent a quantity over a time interval. Alternatively or additionally, these data points may represent a difference between their respective quantities over two successive time intervals.

The training input 300 is processed to generate a set of feature vectors 302 representing each of the data points. The feature vectors 302 are input into machine learning engine 304. Machine learning engine 304 analyzes feature vectors 302 to generate a predictive model 306 for whether a given user account is engaged in broadband internet access sharing based on the types of data points included in training input 300. New input 308 comprising data points of a given user account is then input into the predictive model to generate a determination 310 of whether the user account is engaged in broadband internet access sharing.

Figure 4:
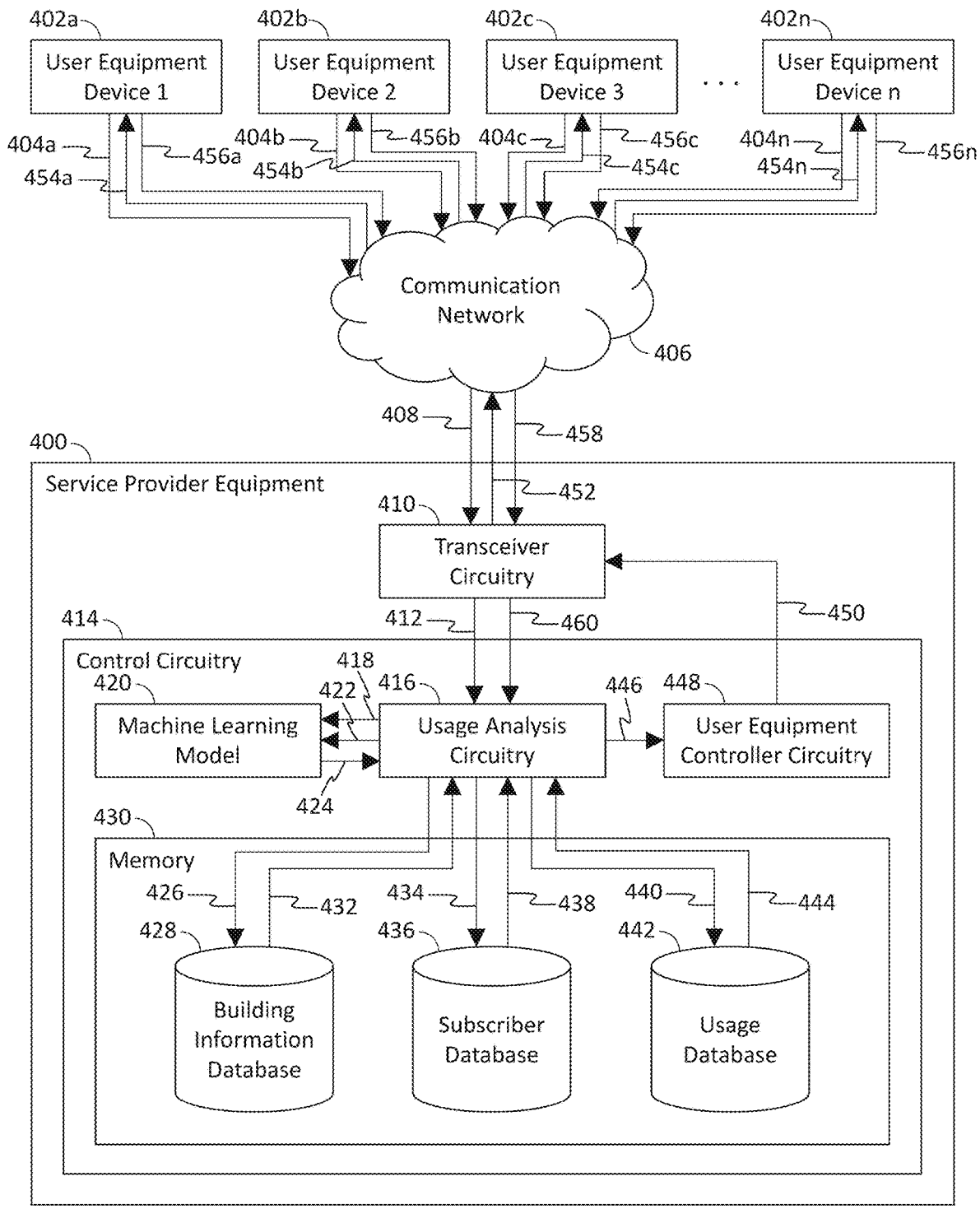
FIG. 4 is a block diagram showing components and dataflow therebetween of service provider equipment for determining whether a user account is engaged in broadband internet access sharing, in accordance with some embodiments of the disclosure.

FIG. 4 is a block diagram showing components and dataflow therebetween of service provider equipment for determining whether a user account is engaged in broadband internet access sharing, in accordance with some embodiments of the disclosure. Service provider equipment 400 collects usage data from a plurality of user equipment devices. Each user equipment devices 402a-402n transmits 404a-404n usage data over communication network 406, which relays 408 the data to service provider equipment 400. This may be in response to a request transmitted by service provider equipment 400 or may be automatically performed periodically.

Service provider equipment 400 receives the usage data using transceiver circuitry 410. Transceiver circuitry 410 comprises a network connection over which data can be transmitted to and received from remote devices, such as an ethernet connection, Wi-Fi connection, mobile broadband interface, or connection employing any other suitable networking protocol. Transceiver circuitry 410 transmits 412 the usage data to control circuitry 414, where it is received using usage analysis circuitry 416. Control circuitry 414 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Because each user equipment device may be made by a different manufacturer, the format in which the usage data is received may differ between user equipment devices. Usage analysis circuitry 416 may process the usage data into a standardized format so that all usage data from all user equipment devices is easily comparable. Usage analysis circuitry 416 transmits 418 the usage data, or standardized usage data, to machine learning model 420. Machine learning model is trained, using the usage data, to determine whether a user account is suspected of engaging in broadband internet access sharing. Once trained, usage analysis circuitry 416 transmits 422 usage data of a user equipment device to machine learning model 420. Machine learning model 420 processes the usage data and transmits 424 a result to usage analysis circuitry 416 indicating whether the user account associated with the usage data is suspected of engaging in broadband internet access sharing.

Usage data alone, however, may not be sufficient to determine whether a user account is engaged in access sharing and may result in false positives. Additional factors may be used to reduce the number of false positives. Usage analysis circuitry may transmit 426 a request to building information database 428, which is stored in memory 430, for information describing a building or portion of a building associated with a suspected user account. Memory 430 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. Although shown in FIG. 4 as being within control circuitry 414, it is noted that memory 430 may also be separate from control circuitry 414. Additionally, memory 430 may be local to service provider equipment 400 or may be located in a remote server. Usage analysis circuitry 416 receives 432 the requested information from building information database 428. Using signal strength of each device connected to the user equipment device, or using Wi-Fi mapping, usage analysis circuitry 416 determines the location and/or distance from the user equipment device of each device connected thereto. Usage analysis circuitry 416 then determines whether each device is within the building or portion of the building associated with the user account. If a device is outside the building or portion of the building, it is likely that the device does not belong to the account owner and that the account owner has shared access with that device.

Usage analysis circuitry 416 may also transmit 434 a request to subscriber database 436 for information about subscribers in neighboring units or houses to the unit or house associated with the user account. In response to the request, usage analysis circuitry 416 receives 438 data describing the subscription status of units and/or houses adjacent to the unit or house associated with the user account. Usage analysis circuitry 416 then determines a location of each device connection to the user equipment associated with the user account. Usage analysis circuitry 416 determines in which unit or house any device outside the unit or house associated with the user account is located. Based on the subscriber data, usage analysis circuitry 416 determines whether the device is located in a unit or house that is associated with an active user account. If so, then it may be of no consequence to the service provider that the device is using the connection of another subscriber, and the device may not be considered as being engaged in access sharing. In some cases, however, the user account associated with the device may be subscribed to a lower tier service plan while the user account whose access is being shared subscribed to a higher tier service plan. The service provider may therefore deem the device to be engaged in access sharing despite being associated with an active user account.

Usage analysis circuitry 416 may further request 440 historical usage data for the user account from a usage database 442. In response to the request, usage analysis circuitry 416 receives 444 historical usage data for the user account. Usage analysis circuitry 416 may compare the current usage data obtained from the user equipment device associated with the user account to historical usage data for similar times of day, days of the week, or other parameters. In this way, usage analysis circuitry 416 may determine whether the current usage data is unusual for the user account. If the machine learning model finds the current usage data indicative of suspected access sharing, a comparison of the current usage data with historical usage data can be used to confirm whether the current usage data is indeed indicative of access sharing, or if, despite being an outlier for the average user account, the current usage data is consistent with historical usage data. Usage analysis circuitry 416 may also use any other method or process discussed above or described in further detail below in connection with FIGS. 5-12 to determine whether a suspected user account is indeed engaged in access sharing.

Usage analysis circuitry 416 may also use device signal strength to determine whether a user equipment device is serving a device that is not owned by the subscriber. For example, usage analysis circuitry 416 may obtain signal strength readings for every device connected, via Wi-Fi, to the user equipment device. Usage analysis circuitry 416 then transmits 446 an instruction to user equipment controller circuitry 448 to deactivate a range extension function of the user equipment device. User equipment controller circuitry 448 may be capable of issuing commands to managed routers provided to subscribers by the service provider. User equipment controller circuitry 448 transmits 450 a range extension deactivation command to transceiver circuitry 410, which in turn transmits 452 the command through communication network 406. Communication network 406 routes the command to the target user equipment device. For example, if the target user equipment device is user equipment device 1 402a, the command is transmitted 454a to user equipment device 1 402a. User equipment device 1 402a temporarily deactivates its range extension function in response to the command. During the time that the range extension function is deactivated, user equipment device 1 402a transmits 456a signal strength data for all devices connected, via Wi-Fi, to user equipment device 1 402a. Communication network 406 transmits 458 the signal strength data to service provider equipment 400, where it is received using transceiver circuitry 410, which in turn transmits 460 the signal strength data to usage analysis circuitry 416. Usage analysis circuitry 416 compares this signal strength data with signal strength data previously recorded. If a device experienced a significant drop in signal strength while the range extension function was deactivated, it is likely that that device is outside the area normally covered by the user equipment (i.e., the unit or house associated with the user account), and therefore the user account is likely engaged in access sharing.

After eliminating as many false positives as possible, service provider equipment 400 may transmit warning messages to user accounts still suspected of being engaged in access sharing. For example, service provider equipment 400 may send an automated email message to an email address associated with the user account. In another example, service provider equipment 400 may send push notifications to a primary device associated with the user account, or to devices connected to the user equipment device associated with the account that are suspected of being unauthorized devices. Service provider equipment 400 may also limit or disable internet access for the suspected unauthorized devices by transmitting commands to the user equipment device to disable a Wi-Fi channel being used by the unauthorized device or preventing data from being transmitted from the user equipment device to the unauthorized device.

Figure 5:
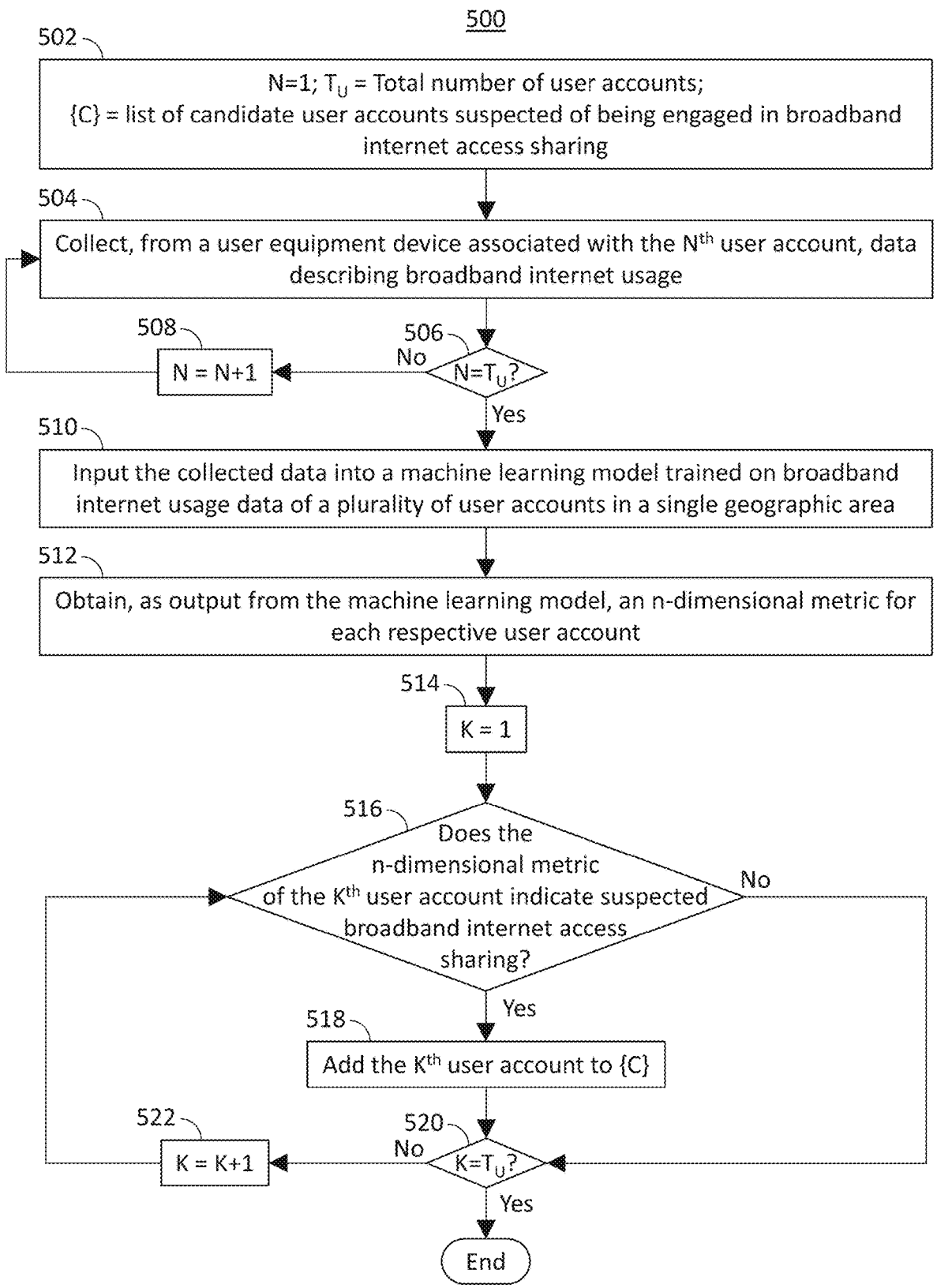
FIG. 5 is a flowchart representing an illustrative process for identifying candidate user accounts suspected of being engaged in broadband internet access sharing, in accordance with some embodiments of the disclosure.

FIG. 5 is a flowchart representing an illustrative process 500 for identifying candidate user accounts suspected of being engaged in broadband internet access sharing, in accordance with some embodiments of the disclosure. Process 500 may be implemented on control circuitry 414. In addition, one or more actions of process 500 may be incorporated into or combined with one or more actions of any other process or embodiment described herein.

At 502, control circuitry 414 initializes a counter variable N, setting its value to one, a variable $T_U$ representing the total number of user accounts, and a list or data structure {C} to contain a list of candidate user accounts suspected of being engaged in broadband internet access sharing. At 504, control circuitry 414 collects, from a user equipment device associated with the $N^{th}$ user account, data describing broadband internet usage. For example, control circuitry 414 may transmit a request to the user equipment for information describing data throughput (upload and/or download), bandwidth usage, number of devices connected to the user equipment, or any other relevant information. Alternatively, the user equipment may periodically report such data to the service provider and may be stored in a database in association with the $N^{th}$ user account. Control circuitry 414 may then request, retrieve, or otherwise obtain the reported usage data from the database.

At 506, control circuitry 414 determines whether N is equal to $T_U$, meaning that usage data has been collected from all user equipment devices associated with each user account. If N is not equal to $T_U$ ("No" at 506), then, at 508, control circuitry 414 increments the value of N by one, and processing returns to 504. If N is equal to $T_U$ ("Yes" at 506), then, at 510, control circuitry 414 inputs the collected data into a machine learning model trained on broadband internet usage data of a plurality of user accounts in a single geographic area. In some embodiments, multiple machine learning models may be trained on usage data for different geographic areas. This allows the service provider to process usage data for a user account using a machine learning model specific to the geographic area in which the user equipment associated with the user account is located.

At 512, control circuitry 414 obtains, as output from the machine learning model, an n-dimensional metric for each respective user account. For example, a metric obtained for a user account may be comprised of different data points or vectors describing different measurements of broadband internet usage. As an example, the metric for a user account may be in the format {UL, DL, A}, where UL represents a number of bits uploaded in a given time period, DL represents a number of bits downloaded in the same time period, and A represents the number of browser-based ads served to devices connected to the user equipment associated with the user account during the time period.

At 514, control circuitry 414 initializes a second counter variable K, setting its value to one. At 516, control circuitry 414 determines whether the n-dimensional metric of the $K^{th}$ user account indicates suspected broadband internet access sharing. For example, control circuitry 414 may plot the n-dimensional metric in a corresponding n-dimensional space along with metrics of other user accounts known not to be engaged in broadband internet access sharing. If the distance between the point in the n-dimensional space to which the metric is plotted is greater than a threshold distance from points at which the metrics of the other user accounts are plotted, control circuitry 414 may determine that the $K^{th}$ user account is suspected of being engaged in access sharing ("Yes" at 516) and, at 518, add the $K^{th}$ user account to {C}.

After adding the $K^{th}$ user account to {C}, or if the $K^{th}$ user account is not suspected of being engaged in access sharing ("No" at 516), at 520, control circuitry 414 determines whether K is equal to $T_U$, meaning that the n-dimensional metric of each user account has been processed. If K is not equal to $T_U$ ("No" at 520), then, at 522, control circuitry 414 increments the value of K by one, and processing returns to 516. If K is equal to $T_U$ ("Yes" at 520), then the process ends.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
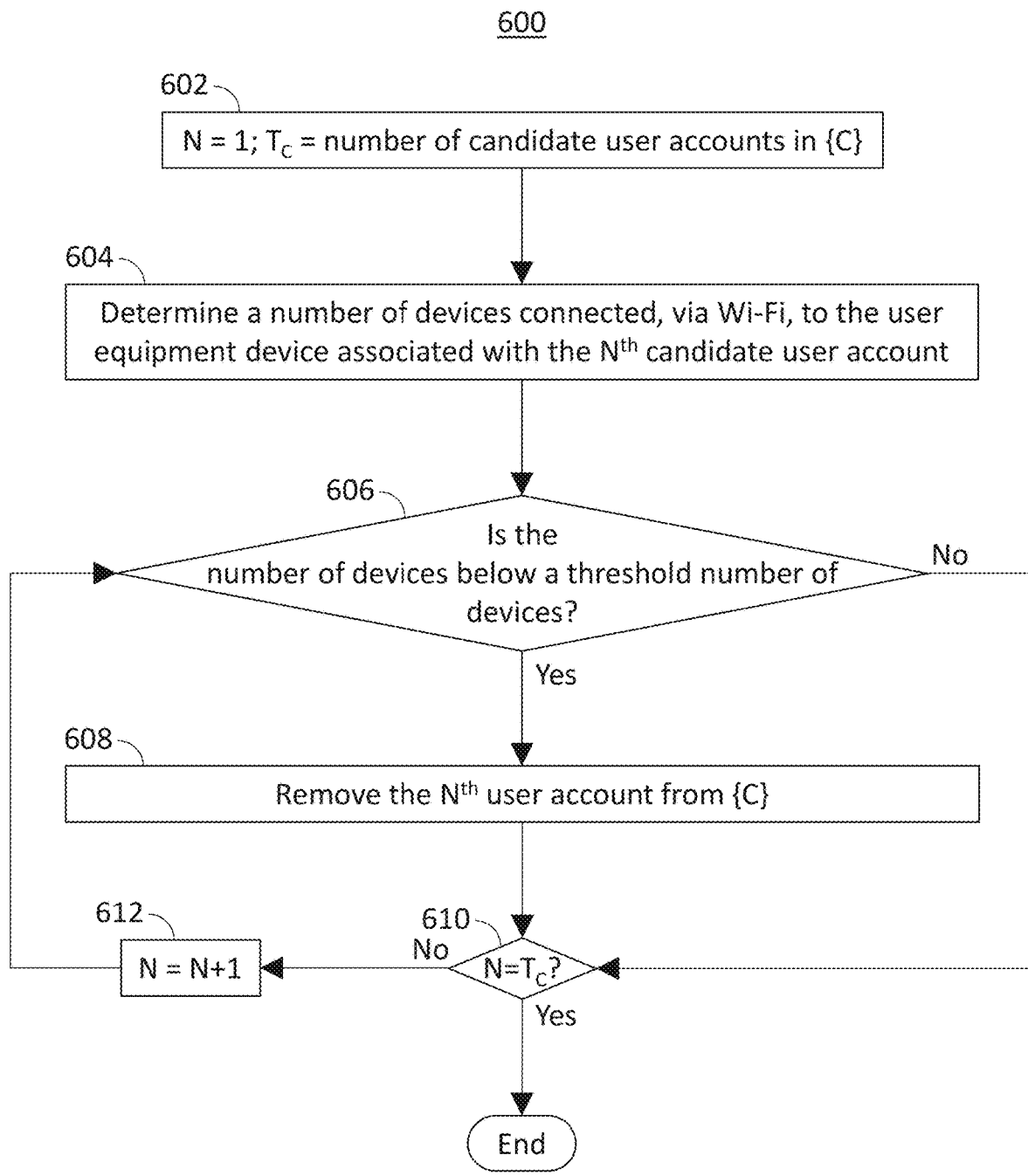
FIG. 6 is a flowchart representing an illustrative process for narrowing the list of candidate user accounts based on the number of devices connected to a user equipment device associated with a user account, in accordance with some embodiments of the disclosure.

FIG. 6 is a flowchart representing an illustrative process 600 for narrowing the list of candidate user accounts based on the number of devices connected to a user equipment device associated with a user account, in accordance with some embodiments of the disclosure. Process 600 may be implemented on control circuitry 414. In addition, one or more actions of process 600 may be incorporated into or combined with one or more actions of any other process or embodiment described herein.

At 602, control circuitry 414 initializes a counter variable N, setting its value to one, and a variable $T_C$ representing the number of candidate user accounts in {C}. At 604, control circuitry 414 determines a number of devices connected, via Wi-Fi, to the user equipment device associated with the $N^{th}$ user account. For example, control circuitry 414 may transmit a request to the user equipment device for the number of devices connected via Wi-Fi. This may be a simple count of devices or may be based on the number of IP addresses assigned by the user equipment to connected devices.

At 606, control circuitry 414 determines whether the number of devices is below a threshold number of devices. If the number of devices is below the threshold, it is likely that all devices connected to the user equipment device are authorized devices (i.e., devices owned by members of the household associated with the user account). The threshold may be based on an average number of authorized devices across non-suspected user accounts. If the number of devices is below the threshold ("Yes" at 606), then, at 608, control circuitry 414 removes the $N^{th}$ user account from {C}.

After removing the $N^{th}$ user account from {C}, or if the number of devices connected, via Wi-Fi, to the user equipment device meets or exceeds the threshold ("No" at 606), at 610, control circuitry 414 determines whether N is equal to $T_C$, meaning that all user accounts have been processed. If N is not equal to $T_C$ ("No" at 610), then, at 612, control circuitry 414 increments the value of N by one, and processing returns to 606. If N is equal to $T_C$ ("Yes" at 610), then the process ends.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
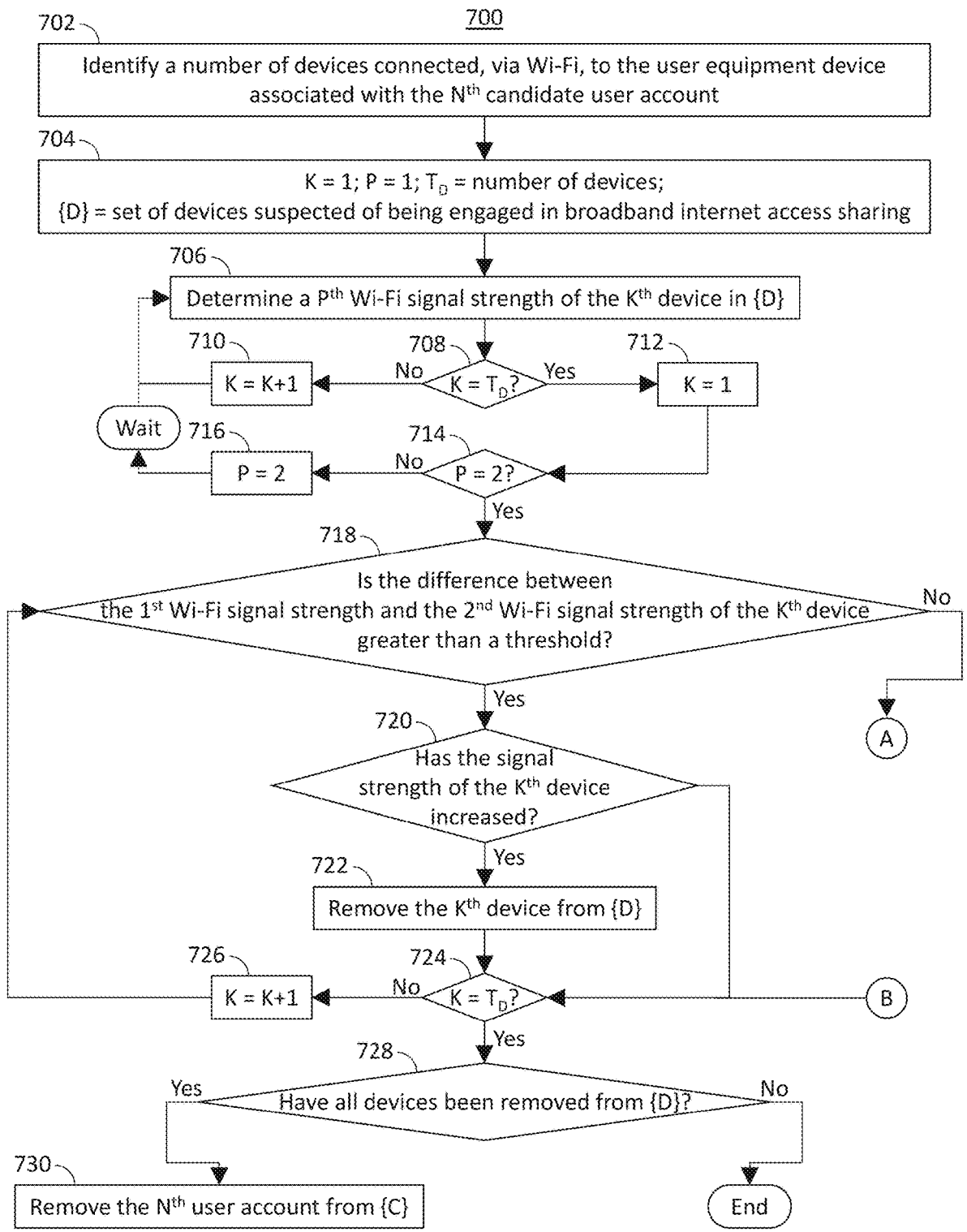
FIG. 7 is a flowchart representing an illustrative process for narrowing the list of candidate user accounts based on changes in signal strength of devices connected, via Wi-Fi, to a user equipment device associated with a user account, in accordance with some embodiments of the disclosure.

FIG. 7 is a flowchart representing an illustrative process 700 for narrowing the list of candidate user accounts based on changes in signal strength of devices connected, via Wi-Fi, to a user equipment device associated with a user account, in accordance with some embodiments of the disclosure. Process 700 may be implemented on control circuitry 414. In addition, one or more actions of process 700 may be incorporated into or combined with one or more actions of any other process or embodiment described herein.

At 702, control circuitry 414 identifies a number of devices connected, via Wi-Fi, to the user equipment device associated with the $N^{th}$ account. This may be accomplished using methods described above in connection with FIG. 6. At 704, control circuitry 414 initializes a counter variable K, setting its value to one, a variable P, setting its value to one, a variable $T_D$ representing the number of devices connected, via Wi-Fi, to the user equipment device, and a list or data structure {D} to contain a set of devices suspected of being engaged in broadband internet access sharing. Initially, all devices are added to list {D}.

At 706, control circuitry 414 determines a $P^{th}$ Wi-Fi signal strength of the $K^{th}$ device in {D}. For example, control circuitry 414 may transmit a request to the user equipment for data describing the signal strength of each device connected, via Wi-Fi, to the user equipment. Control circuitry 414 may use an identifier of the $K^{th}$ device, such as an IP address or MAC address, to retrieve the corresponding signal strength of the $K^{th}$ device from the data describing the signal strength of each device.

At 708, control circuitry 414 determines whether K is equal to $T_D$, meaning that a $P^{th}$ signal strength has been determined for each device connected, via Wi-Fi, to the user equipment device. If K is not equal to $T_D$ ("No" at 708), then, at 710, control circuitry 414 increments the value of K by one, and processing returns to 706. If K is equal to $T_D$ ("Yes" at 708), then, at 712, control circuitry 414 resets the value of K to one. At 714, control circuitry 414 then determines whether P is equal to two. If not ("No" at 714), then the signal strength of each device has only been determined once. A second determination must be made at a second time in order to calculate a difference in signal strength. Thus, at 716, control circuitry 414 sets the value of P to two. Control circuitry 414 then waits a period of time (e.g., one minute) before processing returns to 706. The actions described at 706-712 are then repeated to determine a second signal strength of each device.

If P is equal to two ("Yes" at 714), then, at 718, control circuitry 414 determines whether the difference between the first Wi-Fi signal strength and the second Wi-Fi signal strength of the $K^{th}$ device is greater than a threshold. For example, control circuitry 414 may calculate a change in signal strength for the $K^{th}$ device by subtracting the second signal strength from the first signal strength. Since signal strength measurements are often express as a negative number of decibel-milliwatts (dBm), the absolute values of the first and second signal strength may be used in this calculation. If the different is greater than a threshold amount, such as a change of more than ten dBm ("Yes" at 718), then, at 720, control circuitry 414 determines whether the signal strength of the $K^{th}$ device has increased. If the signal strength has gotten stronger, it is likely that the device is located within the unit or house associated with the user account and, therefore, it is likely that the device is authorized. If the signal strength of the $K^{th}$ device has increased ("Yes" at 720), then, at 722, control circuitry 414 removes the $K^{th}$ device from {D}. Actions taken by control circuitry 414 in response to determining that the difference between the first and second signal strengths of the $K^{th}$ device is at or below the threshold ("No" at 718) are discussed below in connection with FIG. 8.

After removing the $K^{th}$ device from {D}, or after performing actions described below in connection with FIG. 8, at 724, control circuitry 414 determines whether K is equal to $T_D$, meaning that the difference in signal strength for each device has been processed. If K is not equal to $T_D$ ("No" at 724), then, at 726, control circuitry 414 increments the value of K by one, and processing returns to 718. If K is equal to $T_D$ ("Yes" at 724), then, at 728, control circuitry 414 determines whether all devices have been removed from {D}. For example, control circuitry 414 may determine a length or dimension of list {D}. If the length is zero, then all devices have been removed. Alternatively, control circuitry 414 may use another counter variable that is incremented for every device that is removed from {D}. Control circuitry 414 can then compare the value of the variable to $T_D$ to determine if they are the same value. If all devices have been removed from {D} ("Yes" at 728), then, at 730, control circuitry 414 removes the N$^{th}$ user account from {C}. Otherwise ("No" at 728), the process ends.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
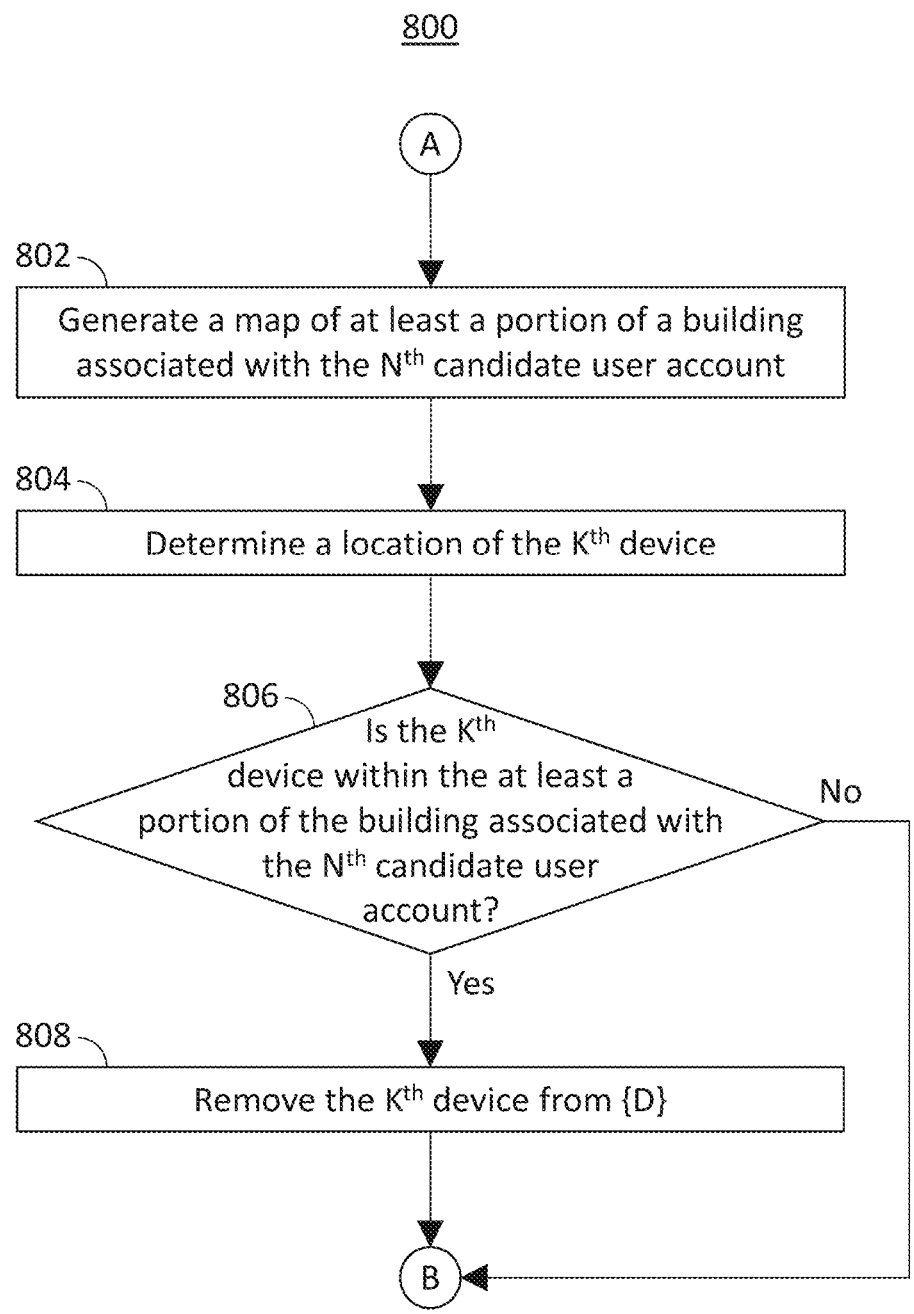
FIG. 8 is a flowchart representing an illustrative process for determining whether a device is within a portion of a building associated with a user account, in accordance with some embodiments of the disclosure.

FIG. 8 is a flowchart representing an illustrative process 800 for determining whether a device is within a portion of a building associated with a user account, in accordance with some embodiments of the disclosure. Process 800 may be implemented on control circuitry 414. In addition, one or more actions of process 800 may be incorporated into or combined with one or more actions of any other process or embodiment described herein.

At 802, control circuitry 414 generates a map of at least a portion of a building associated with the N$^{th}$ user account. This may be accomplished using any known methods for performing Wi-Fi mapping, or may be generated from publicly available building data. At 804, control circuitry 414 determines a location of the K$^{th}$ device. Since the signal strength of the K$^{th}$ device has not changed more than a threshold amount ("No" at 718 of FIG. 7), it is likely that the K$^{th}$ device is located outside the building or in a location that is only just within the mapped area. At 806, control circuitry 414 determines whether the K$^{th}$ device in within the portion of the building associated with the N$^{th}$ user account. For example, control circuitry 414 may calculate a distance between the user equipment device and the K$^{th}$ device based on the signal strength of the K$^{th}$ device. This may be accomplished using Equation 2, above. Alternatively, control circuitry 414 may obtain location data (e.g., GPS coordinates) from the K$^{th}$ device. The location of the K$^{th}$ device is then compared to the mapped area. If the K$^{th}$ device is within the mapped area ("Yes" at 806), then, at 808, control circuitry 414 removes the K$^{th}$ device from {D}. After removing the K$^{th}$ device from {D}, or if the K$^{th}$ device is not within the mapped area ("No" at 806), then processing continues at 724 of FIG. 7.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
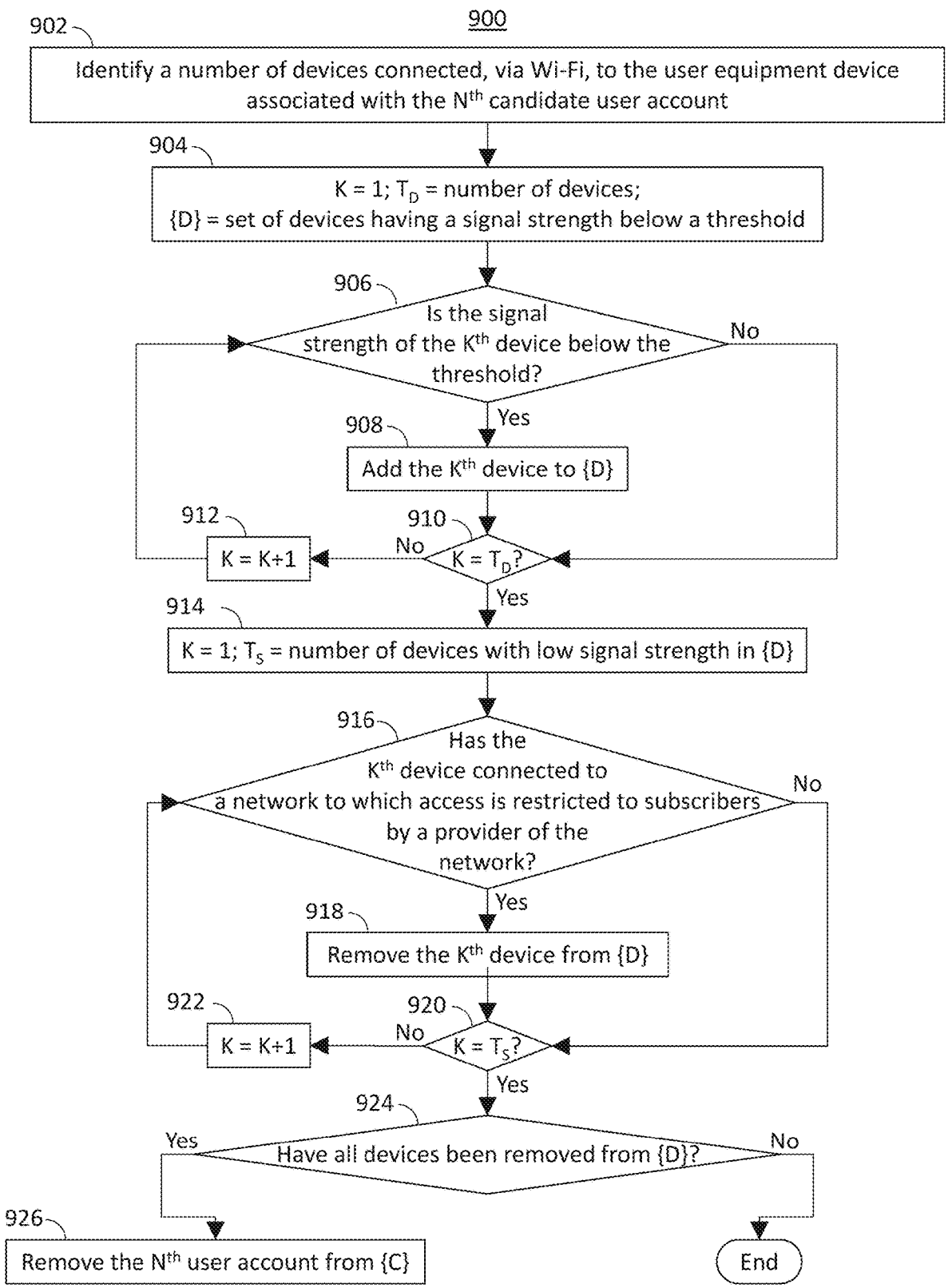
FIG. 9 is a flowchart representing an illustrative process for narrowing the list of candidate user accounts based on whether devices connected, via Wi-Fi, to a user equipment device associated with a user account that have signal strengths below a threshold have connected to a network to which access is restricted to subscribers, in accordance with some embodiments of the disclosure.

FIG. 9 is a flowchart representing an illustrative process 900 for narrowing the list of candidate user accounts based on whether devices connected, via Wi-Fi, to a user equipment device associated with a user account that have signal strengths below a threshold have connected to a network to which access is restricted to subscribers, in accordance with some embodiments of the disclosure. Process 900 may be implemented on control circuitry 414. In addition, one or more actions of process 900 may be incorporated into or combined with one or more actions of any other process or embodiment described herein.

At 902, control circuitry 414 identifies a number of devices connected, via Wi-Fi, to the user equipment device associated with the N$^{th}$ user account. This may be accomplished using methods described above to determine a number of connected devices, but with the additional step of retrieving an identifier of each connected device. At 904, control circuitry 414 initializes a counter variable K, setting its value to one, a variable T$_D$ representing the number of devices, and a list or data structure {D} to contain a set of devices having a signal strength below a threshold. At 906, control circuitry 414 determines whether the signal strength of the K$^{th}$ device is below a threshold signal strength.

Methods described above in connection with FIG. 7 may be used to obtain a signal strength for the K$^{th}$ device, which is then compared to a threshold signal strength value. The threshold signal strength value may be determined based on the reception capabilities/sensitivity of the user equipment device associated with the N$^{th}$ user account. For example, a low-sensitivity user equipment device may lose or drop a Wi-Fi connection with a device when the signal strength falls below −70 dBm, while a higher-sensitivity user equipment device may be able to maintain a stable connection with a device until the signal strength falls below −85 dBm. If the signal strength of the K$^{th}$ device is below the threshold ("Yes" at 906), then, at 908, control circuitry 414 adds the K$^{th}$ device to {D}. After adding the K$^{th}$ device to {D}, or if the signal strength of the K$^{th}$ device is at or above the threshold ("No" at 906), at 910, control circuitry 414 determines whether K is equal to T$_D$, meaning that the signal strength of each device was compared to the threshold. If K is not equal to T$_D$ ("No" at 910), then, at 912, control circuitry 414 increments the value of K by one, and processing returns to 906.

If K is equal to T$_D$ ("Yes" at 910), then, at 914, control circuitry 414 resets the value of K to one and initializes a variable T$_S$ representing the number of devices with low signal strength in {D}. At 916, control circuitry 414 determines whether the K$^{th}$ device has ever connected to a network to which access is restricted to subscribers by a provider of the network. For example, the service provider may also maintain a mobile data network. Access to the mobile data network may be restricted to subscribers by requiring account passwords or details the users would be unlikely to share with others. Control circuitry 414 may compare an identifier of the K$^{th}$ device (e.g., MAC address, IMEI number, phone number) to a historical list of devices that have connected to the restricted network. If the K$^{th}$ device has connected to the restricted network in the past ("Yes" at 916), then, at 918, control circuitry 414 removes the K$^{th}$ device from {D}.

In some embodiments, control circuitry 414 may determine whether the K$^{th}$ device has connected, or maintains connections to, multiple services, networks, or accounts using authentication credentials associated with a user of the N$^{th}$ user account. For example, control circuitry 414 may determine whether the K$^{th}$ device is logged into the same personal email account as at least one device associated with the N$^{th}$ user account. Other examples may include streaming service account (e.g., Netflix), banking websites and/or apps, home security systems, etc. If the K$^{th}$ device is connected to more than one of these accounts, then the K$^{th}$ device is most likely an authorized device.

After removing the K$^{th}$ device from {D}, or if the K$^{th}$ device has not connected to the restricted network ("No" at 916), at 920, control circuitry 414 determines whether K is equal to T$_S$, meaning that the connection history of all devices in {D} has been processed. If K is not equal to T$_S$ ("No" at 920), then, at 922, control circuitry 414 increments the value of K by one, and processing returns to 916. If K is equal to T$_S$ ("Yes" at 620), then, at 924, control circuitry 414 determines whether all devices have been removed from {D}. This may be accomplished using methods described above in connection with FIG. 7. If all devices have been removed from {D} ("Yes" at 924), then, at 926, control circuitry 414 removes the N$^{th}$ user account from {C}. Otherwise ("No" at 924), the process ends.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
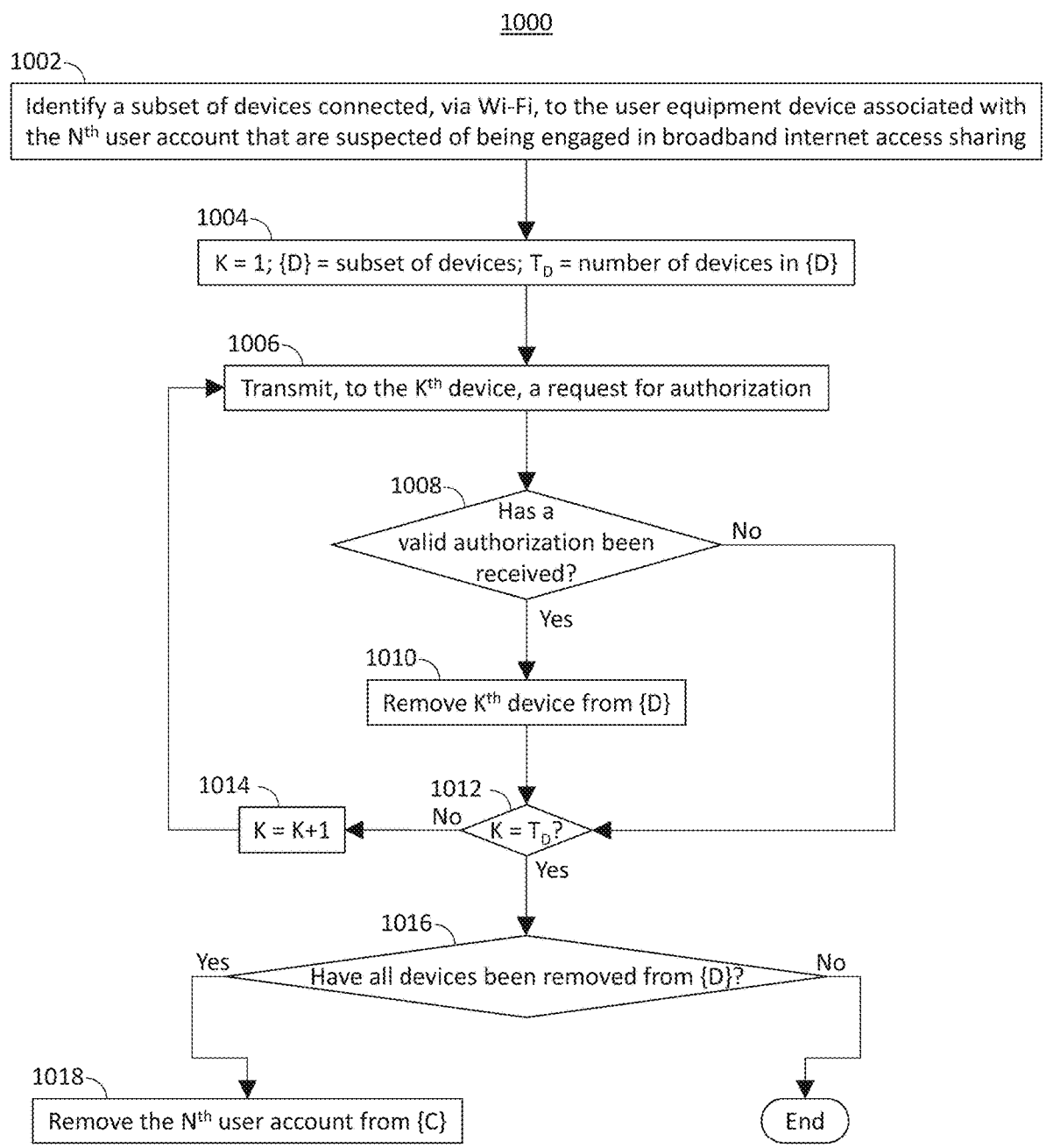
FIG. 10 is a flowchart representing an illustrative process for narrowing the list of candidate user accounts by requesting an authorization from devices connected, via Wi-Fi, to a user equipment device associated with a user account, in accordance with some embodiments of the disclosure.

FIG. 10 is a flowchart representing an illustrative process 1000 for narrowing the list of candidate user accounts by requesting an authorization from devices connected, via Wi-Fi, to a user equipment device associated with a user account, in accordance with some embodiments of the disclosure. Process 1000 may be implemented on control circuitry 414. In addition, one or more actions of process 1000 may be incorporated into or combined with one or more actions of any other process or embodiment described herein.

At 1002, control circuitry 414 identifies a subset of devices connected, via Wi-Fi, to the user equipment device associated with the $N^{th}$ user account that are suspected of being engaged in broadband internet access sharing. This may be accomplished using methods described above or below in connection with FIGS. 5-9 and 11-12. At 1004, control circuitry 414 initializes a counter variable K, setting its value to one, a list or data structure {D} to contain the subset of devices, and a variable $T_D$ representing the number of devices in the subset.

At 1006, control circuitry 414 transmits, to the $K^{th}$ device in {D}, a request for authorization. For example, control circuitry 414 may transmit a challenge question to the $K^{th}$ device. The challenge question may provide multiple choices for a response or may provide a space for a user of the $K^{th}$ device to enter text in response to the challenge question. The challenge question may ask for information that is likely to be known only to the account holder, such as an administrative password for the user equipment device, or personal information that is customarily used for security questions by many service providers.

At 1008, control circuitry 414 determines whether a valid authorization has been received. For example, control circuitry 414 may determine whether any response to the request has been received. If a response has been received, the response is checked to determine if the user of the $K^{th}$ device provided the correct answer to the challenge question. If so ("Yes" at 1008), then, at 1010, control circuitry 414 removes the $K^{th}$ device from {D}. After removing the $K^{th}$ device from {D}, or if a valid authorization has not been received (e.g., no response has been received after a period of time or an incorrect response has been received), at 1012, control circuitry 414 determines whether K is equal to $T_D$, meaning that requests for authorization have been transmitted to each device in {D}. If K is not equal to $T_D$ ("No" at 1012), then, at 1014, control circuitry 414 increments the value of K by one, and processing returns to 1006.

If K is equal to $T_D$ ("Yes" at 1012), then, at 1016, control circuitry 414 determines whether all devices have been removed from {D}. This may be accomplished using methods described above in connection with FIG. 7. If all devices have been removed from {D} ("Yes" at 1016), then, at 1018, control circuitry 414 removes the $N^{th}$ user account from {C}. Otherwise ("No" at 1016), the process ends.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
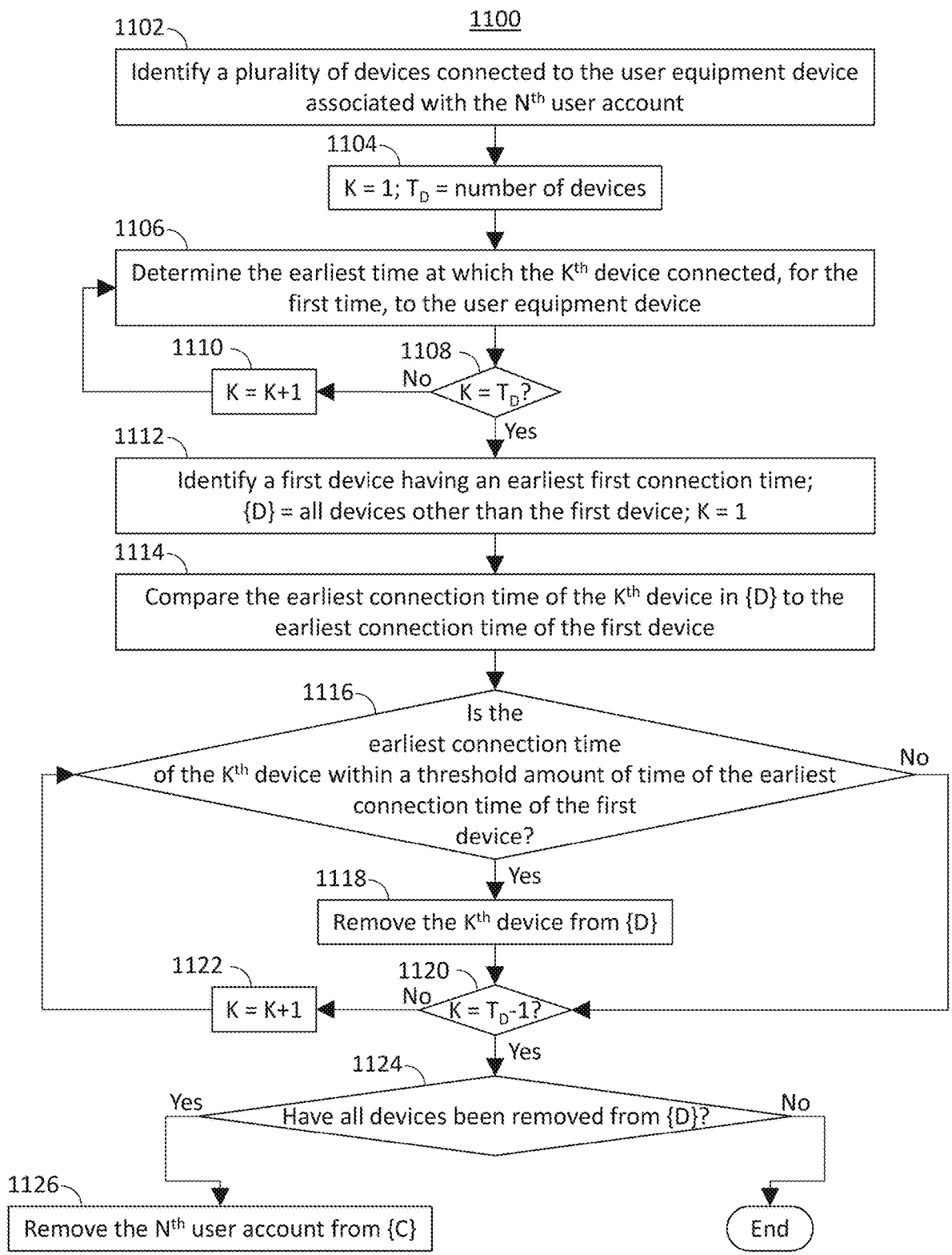
FIG. 11 is a flowchart representing an illustrative process for narrowing the list of candidate user accounts based on the earliest connection time of devices connected to a user equipment device associated with a user account, in accordance with some embodiments of the disclosure.

FIG. 11 is a flowchart representing an illustrative process 1100 for narrowing the list of candidate user accounts based on the earliest connection time of devices connected to a user equipment device associated with a user account, in accordance with some embodiments of the disclosure. Process 1100 may be implemented on control circuitry 414. In addition, one or more actions of process 1100 may be incorporated into or combined with one or more actions of any other process or embodiment described herein.

At 1102, control circuitry 414 identifies a plurality of devices connected to the user equipment device associated with the $N^{th}$ user account. For example, control circuitry 414 may obtain information from the user equipment device describing each device connected, either by wire or wirelessly. Control circuitry 414 may use a list of IP address assigned by the user equipment device to identify the devices, or MAC addresses of each device. At 1104, control circuitry 414 initializes a counter variable K, setting its value to one, and a variable $T_D$ representing the number of devices.

At 1106, control circuitry 414 determines the earliest time at which the $K^{th}$ device connected, for the first time, to the user equipment device. For example, the user equipment device may keep a record of each device that has connected to the user equipment device and may log the time at which each device was added to the record. It may be assumed that devices that first connected to the user equipment device are authorized devices that the account owner connected to the user equipment device during or just after setting up the user equipment device. At 1108, control circuitry 414 determines whether K is equal to $T_D$, meaning that the earliest connection time of each device has been determined. If K is not equal to $T_D$ ("No" at 1108), then, at 1110, control circuitry 414 increments the value of K by one, and processing returns to 1106.

If K is equal to $T_D$ ("Yes" at 1108), then, at 1112, control circuitry 414 identifies a first device having an earliest first connection time. For example, control circuitry 414 may compare the recorded first connection times of each device to identify the earliest time. Control circuitry 414 may use any known sort function to arrange the devices in order of first connection time. Control circuitry can then simply select the first device in the sorted list as the device having the earliest first connection time. Control circuitry 414 then initializes a list or data structure {D} containing all other devices and resets the value of K to one.

At 1114, control circuitry 414 compares the earliest connection time of the $K^{th}$ device in {D} with the earliest connection time of the identified device. For example, control circuitry 414 may convert the times into integer values (e.g., representing a number of seconds elapsed since a reference time, such as 0:00 UTC on Jan. 1, 1970) and subtract the first connection time of the identified device from the first connection time of the $K^{th}$ device to obtain a value for the time elapsed between the first connection of the identified device and the first connection of the $K^{th}$ device. At 1116, control circuitry 414 determines whether the earliest connection time of the $K^{th}$ device is within a threshold amount of time of the earliest connection time of the identified device. For example, control circuitry 414 may compare the difference in earliest connection times to a threshold amount of time, such as one week. It is likely that within a week of setting up the user equipment device, all devices belonging to members of the household associated with the user account will have connected to the user equipment device.

If the earliest connection time of the $K^{th}$ device is within the threshold amount of time of the earlier connection time of the identified device ("Yes" at 1116), then, at 1118, control circuitry 414 removes the $K^{th}$ device from {D}. After removing the $K^{th}$ device from {D}, or if the earliest connection time of the $K^{th}$ device is not within the threshold amount of time ("No" at 1116), at 1120, control circuitry 414 determines whether K is equal to $T_D$-1 (i.e., the number of devices connected to the user equipment device aside from the identified device). If K is not equal to $T_D$-1 ("No" at 1120), then, at 1122, control circuitry 414 increments the value of K by one, and processing returns to 1116. If K is equal to $T_D$-1 ("Yes" at 1120), then, at 1124, control circuitry 414 determines whether all devices have been removed from {D}. If so ("Yes" at 1124), then, at 1126, control circuitry 414 removes the $N^{th}$ user account from {C}. Otherwise ("No" at 1124), the process ends.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
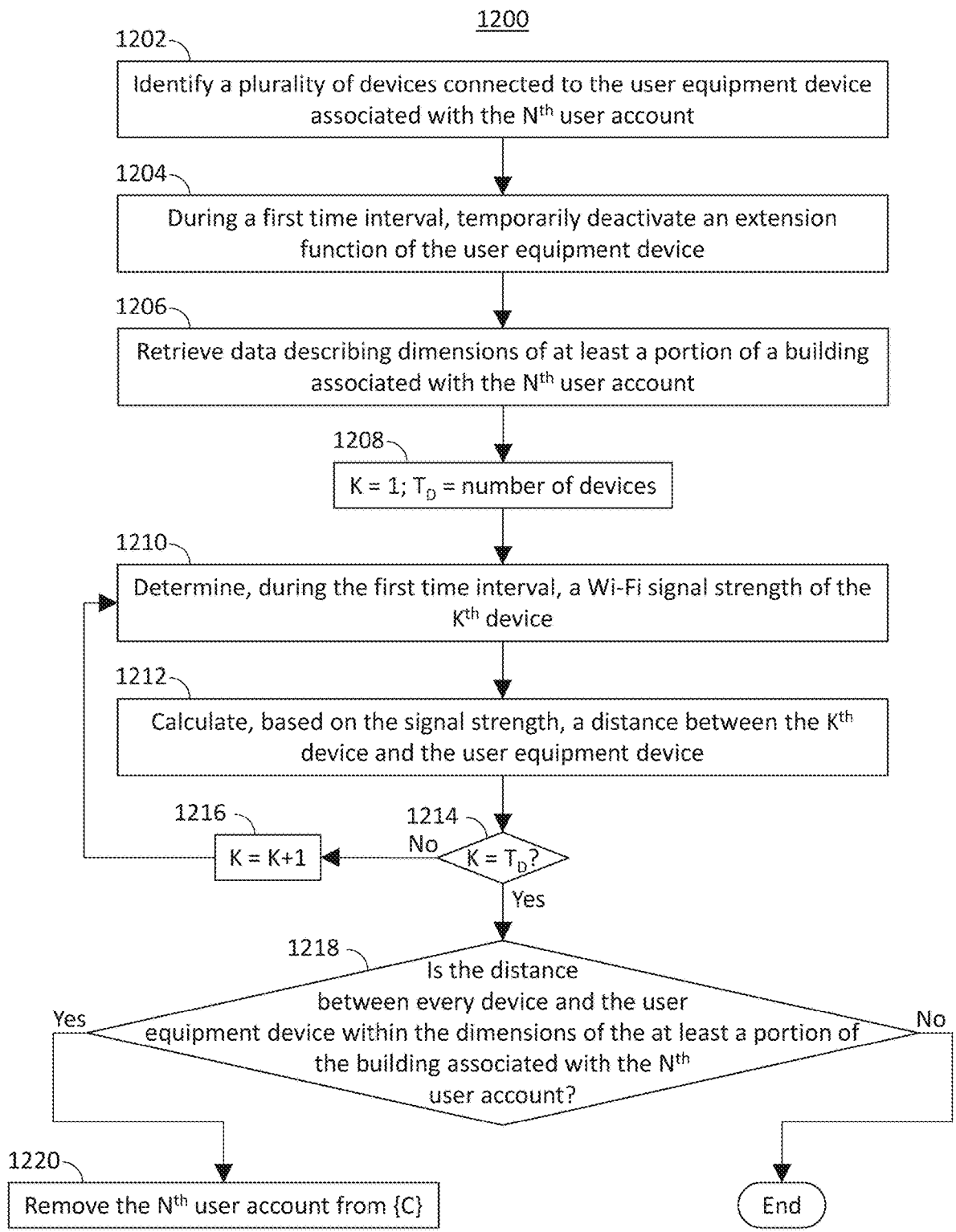
FIG. 12 is a flowchart representing an illustrative process for narrowing the list of candidate user accounts based on whether the distance between devices connected to a user equipment device associated with a user account is within the dimensions of at least a portion of a building associated with the user account, in accordance with some embodiments of the disclosure.

FIG. 12 is a flowchart representing an illustrative process 1200 for narrowing the list of candidate user accounts based on whether the distance between devices connected to a user equipment device associated with a user account is within the dimensions of at least a portion of a building associated with the user account, in accordance with some embodiments of the disclosure. Process 1200 may be implemented on control circuitry 414. In addition, one or more actions of process 1200 may be incorporated into or combined with one or more actions of any other process or embodiment described herein.

At 1202, control circuitry 414 identifies a plurality of devices connected to the user equipment device associated with the $N^{th}$ user account. This may be accomplished using methods described above in connection with FIG. 11. At 1204, control circuitry 414 temporarily deactivates an extension function of the user equipment device during a first time interval. For example, an IEEE 801.11ax mesh network function may be used by the user equipment to extend the range of a Wi-Fi signal. This function may be temporarily deactivated. At 1206, control circuitry 414 retrieves data describing dimensions of at least a portion of a building associated with the $N^{th}$ user account. For example, control circuitry 414 may access public building records to determine the size, dimensions, floorplan, etc., of the building or portion of the building, such as separate dwelling units thereof.

At 1208, control circuitry 414 initializes a counter variable K, setting its value to one, and a variable $T_D$ representing the number of devices connected to the user equipment device. At 1210, control circuitry 414 determines, during the first time interval, a Wi-Fi signal strength of the $K^{th}$ device. This may be accomplished using methods described above in connection with FIG. 7. At 1212, control circuitry 414 calculates, based on the signal strength, a distance between the $K^{th}$ device and the user equipment device. This may be accomplished using Equation 2, above. For example, control circuitry 414 may obtain data from the user equipment device describing the channel frequency used by the $K^{th}$ device along with the signal strength of the $K^{th}$ device. These data are used in Equation 2 to determine a distance between the user equipment device and the $K^{th}$ device.

At 1214, control circuitry 414 determines whether K is equal to $T_D$, meaning that a distance between each device and the user equipment device has been determined. If K is not equal to $T_D$ ("No" at 1214), then, at 1216, control circuitry 414 increments the value of K by one and processing returns to 1210. If K is equal to $T_D$ ("Yes" at 1214), then, at 1218, control circuitry 414 determines whether the distance between every device and the user equipment device is within the dimensions of the at least a portion of the building associated with the $N^{th}$ user account. For example, control circuitry 414 may determine that the building is 20 feet wide and 20 feet long. Control circuitry 414 may calculate the longest distance between two points on the perimeter of the building. In this example, the longest distance is from one corner to its diagonally opposing corner, which for a 20-foot by 20-foot structure is approximately 28 feet. Assuming that the user equipment is placed in the center of the building, the distance between the user equipment device and each device should therefore be within a fourteen-foot radius of the user equipment device. If the distance between every device and the user equipment device is within the dimensions ("Yes" at 1218), then, at 1220, control circuitry 414 removes the $N^{th}$ user account from {C}. Otherwise ("No" at 1218), the process ends.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

After performing any or all of the processes described above, control circuitry 414 may determine whether any user accounts remain in {C}. If so, those accounts are suspected of engaging in broadband internet access sharing. The service provider may begin transmitting warnings to the account owner and/or limiting or preventing data transfer between suspicious devices and the router associated with the user account. Control circuitry 414 may also transmit warnings or other notifications directly to the suspicious devices until the devices are disconnected from the router associated with the user account.

It is noted that any of the above methods and techniques for narrowing the list of candidate user accounts may also be used to generate the list of candidate user accounts. For example, a population of user accounts may be narrowed using any of the above methods or techniques. Data may then be collected only from the narrowed list of candidate user accounts to be fed into the machine learning model.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for identifying user accounts engaged in broadband internet access sharing, the method comprising:
    collecting, from a respective user equipment device associated with each respective user account of a plurality of user accounts, data describing broadband internet usage;
    inputting the data into a machine learning model trained on broadband internet usage data of a plurality of user accounts in a single geographic area;
    obtaining, as output from the machine learning model, an n-dimensional metric for each respective user account;

identifying, based on the n-dimensional metric of each respective user account of the plurality of user accounts, at least one candidate user account suspected of being engaged in broadband internet access sharing; and generating a list of candidate accounts suspected of being engaged in broadband internet access sharing.

2. The method of claim 1, wherein collecting the data describing broadband internet usage further comprises:
measuring, at a first time, at least one broadband internet usage metric;
measuring, at a second time, the at least one broadband internet usage metric;
determining a difference between each of the at least one broadband internet usage metric at the first time and each of the at least one broadband internet usage metric at the second time.

3. The method of claim 2, wherein each broadband internet usage metric of the at least one broadband internet usage metric is selected from the group consisting of: total number of bits downloaded, total number of bits uploaded, peak downstream bandwidth; peak upstream bandwidth, downstream wide-area network link utilization, and number of browser-based ads served.

4. The method of claim 1, further comprising narrowing the list of candidate user accounts suspected of being engaged in broadband internet access sharing by:
determining a number of devices connected, via Wi-Fi, to the respective user equipment device associated with a candidate user account;
comparing the number of devices to a threshold number of devices;
determining, based on the comparing, whether the number of devices connected, via Wi-Fi, to the respective user equipment device is lower than the threshold number of devices; and
in response to determining that the number of devices connected, via Wi-Fi, to the respective user equipment device is lower than the threshold number of devices, removing the candidate user account from the list of candidate user accounts suspected of being engaged in broadband internet access sharing.

5. The method of claim 1, further comprising narrowing the list of candidate user accounts suspected of being engaged in broadband internet access sharing by:
identifying a plurality of devices connected, via Wi-Fi, to the respective user equipment device associated with a candidate user account;
determining, at a first time, for each device of the plurality of devices, a first Wi-Fi signal strength;
identifying a subset of devices of the plurality of devices having a first Wi-Fi signal strength below a threshold signal strength;
determining, at a second time, for each device of the subset of devices, a second Wi-Fi signal strength;
comparing the first Wi-Fi signal strength of a respective device of the subset of devices with the second Wi-Fi signal strength of the respective device of the subset of devices;
determining, based on the comparing, whether the Wi-Fi signal strength of the device has changed more than a threshold amount.

6. The method of claim 5, further comprising:
in response to determining, for each device of the subset of devices, that the Wi-Fi signal strength of the device has changed by more than the threshold amount:
determining whether the Wi-Fi signal strength has risen above a threshold signal strength; and
in response to determining that the Wi-Fi signal strength has risen above a threshold signal strength, removing the device from the subset of devices; and
in response to determining that all devices have been removed from the subset of devices, removing the candidate user account from the list of candidate user account suspected of being engaged in broadband internet access sharing.

7. The method of claim 5, further comprising:
in response to determining, for each device of the subset of devices, that the Wi-Fi signal strength of the device has not changed by more than the threshold amount:
generating a map of at least a portion of a building associated with the candidate user account;
determining a location of the respective device of which the Wi-Fi signal strength has not changed by more than the threshold amount; and
in response to determining that the location of the respective device is within the at least a portion of the building associated with the candidate user account, removing the device from the subset of devices; and
in response to determining that all devices have been removed from the subset of devices, removing the candidate user account from the list of candidate user account suspected of being engaged in broadband internet access sharing.

8. The method of claim 5, further comprising:
determining that a range extender is connected to the user equipment device; and
momentarily deactivating the range extender;
wherein the second time is during the time when the range extender is deactivated.

9. The method of claim 1, further comprising narrowing the list of candidate user accounts suspected of being engaged in broadband internet access sharing by:
identifying a plurality of devices connected, via Wi-Fi, to the respective user equipment device associated with a candidate user account;
identifying a subset of devices of the plurality of devices having a Wi-Fi signal strength below a threshold signal strength;
for each respective device of the subset of devices:
determining whether the respective device has connected to a network to which access is restricted to subscribers by a provider of the network; and
in response to determining that the respective device has connected to the network, removing the respective device from the subset of devices; and
in response to determining that all devices have been removed from the subset of devices, removing the candidate user account from the list of candidate user account suspected of being engaged in broadband internet access sharing.

10. The method of claim 1, further comprising narrowing the list of candidate user accounts suspected of being engaged in broadband internet access sharing by:
identifying a subset of devices connected, via Wi-Fi, to the respective user equipment device associated with a candidate user account, that are suspected of being engaged in broadband internet access sharing;
for each respective device of the subset of devices:
transmitting, to the respective device, a request for authorization; and in response to receiving, from the respective device, a valid authorization, removing the device from the subset of devices; and in response to determining that all devices have been removed from the subset of devices, removing the candidate user account from the list of candidate user account suspected of being engaged in broadband internet access sharing.

11. The method of claim 1, further comprising narrowing the list of candidate user accounts suspected of being engaged in broadband internet access sharing by:

identifying a plurality of devices connected to the respective user equipment device associated with a candidate user account;

determining, for each device of the plurality of devices, a first connection time, wherein the first connection time is an earliest time at which the device connected for the first time, to the respective user equipment device;

identifying a first device having an earliest first connection time;

for each respective device of the plurality of devices other than the first device:

comparing the first connection time of the respective device to the first connection time of the first device; and in response to determining, based on the comparing, that the first connection time of the respective device is within a threshold amount of time of the first connection time of the first device, removing the respective device from the plurality of devices; and in response to determining that all devices other than the first device have been removed from the plurality of devices, removing the candidate user account from the list of candidate user account suspected of being engaged in broadband internet access sharing.

12. The method of claim 1, further comprising narrowing the list of candidate user accounts suspected of being engaged in broadband internet access sharing by:

identifying a plurality of devices connected, via Wi-Fi, to the respective user equipment device associated with a candidate user account;

during a first time interval, temporarily deactivating an extension function of the respective user equipment device associated with the candidate user account;

retrieving data describing dimensions of least a portion of a building associated with the candidate user account;

for each respective device of the plurality of devices:

determining, during the first time interval, a Wi-Fi signal strength of the respective device; and calculating, based on the signal strength of the respective device, a distance between the respective device and the respective user equipment device;

determining whether the distance between any device of the plurality of devices and the respective user equipment device exceeds the dimensions of the at least a portion of the building associated with the candidate user account; and in response to determining that the distance between every device of the plurality of devices and the respective user equipment is within the dimensions of the at least a portion of the building associated with the candidate user account, removing the candidate user account from the list of candidate user accounts suspects of being engaged in broadband internet access sharing.

13. A system for identifying user accounts engaged in broadband internet access sharing, the system comprising:

input/output circuitry; and control circuitry configured to:

collect, using the input/output circuitry, from a respective user equipment device associated with each respective user account of a plurality of user accounts, data describing broadband internet usage;

input the data into a machine learning model trained on broadband internet usage data of a plurality of user accounts in a single geographic area;

obtain, as output from the machine learning model, an n-dimensional metric for each respective user account;

identify, based on the n-dimensional metric of each respective user account of the plurality of user accounts, at least one candidate user account suspected of being engaged in broadband internet access sharing; and generate a list of candidate accounts suspected of being engaged in broadband internet access sharing.

14. The system of claim 13, wherein the control circuitry configured to collect, using the input/output circuitry, the data describing broadband internet usage is further configured to:

measure, using the input/output circuitry, at a first time, at least one broadband internet usage metric;

measure, using the input/output circuitry, at a second time, the at least one broadband internet usage metric; and determine a difference between each of the at least one broadband internet usage metric at the first time and each of the at least one broadband internet usage metric at the second time.

15. The system of claim 14, wherein each broadband internet usage metric of the at least one broadband internet usage metric is selected from the group consisting of: total number of bits downloaded, total number of bits uploaded, peak downstream bandwidth; peak upstream bandwidth, downstream wide-area network link utilization, and number of browser-based ads served.

16. The system of claim 13, wherein the control circuitry is further configured to narrow the list of candidate user accounts suspected of being engaged in broadband internet access sharing by:

determining, using the input/output circuitry, a number of devices connected, via Wi-Fi, to the respective user equipment device associated with a candidate user account;

comparing the number of devices to a threshold number of devices;

determining, based on the comparing, whether the number of devices connected, via Wi-Fi, to the respective user equipment device is lower than the threshold number of devices; and in response to determining that the number of devices connected, via Wi-Fi, to the respective user equipment device is lower than the threshold number of devices, removing the candidate user account from the list of candidate user accounts suspected of being engaged in broadband internet access sharing.

17. The system of claim 13, wherein the control circuitry is further configured to narrow the list of candidate user accounts suspected of being engaged in broadband internet access sharing by:

identifying, using the input/output circuitry, a plurality of devices connected, via Wi-Fi, to the respective user equipment device associated with a candidate user account;

determining, at a first time, for each device of the plurality of devices, a first Wi-Fi signal strength;

identifying a subset of devices of the plurality of devices having a first Wi-Fi signal strength below a threshold signal strength;

determining, at a second time, for each device of the subset of devices, a second Wi-Fi signal strength;

comparing the first Wi-Fi signal strength of a respective device of the subset of devices with the second Wi-Fi signal strength of the respective device of the subset of devices;

determining, based on the comparing, whether the Wi-Fi signal strength of the device has changed more than a threshold amount.

18. The system of claim 17, wherein the control circuitry is further configured to:

in response to determining, for each device of the subset of devices, that the Wi-Fi signal strength of the device has changed by more than the threshold amount:
   determine whether the Wi-Fi signal strength has risen above a threshold signal strength; and
   in response to determining that the Wi-Fi signal strength has risen above a threshold signal strength, remove the device from the subset of devices; and in response to determining that all devices have been removed from the subset of devices, remove the candidate user account from the list of candidate user account suspected of being engaged in broadband internet access sharing.

19. The system of claim 17, wherein the control circuitry is further configured to:

in response to determining, for each device of the subset of devices, that the Wi-Fi signal strength of the device has not changed by more than the threshold amount:
   generate a map of at least a portion of a building associated with the candidate user account;
   determine a location of the respective device of which the Wi-Fi signal strength has not changed by more than the threshold amount; and
   in response to determining that the location of the respective device is within the at least a portion of the building associated with the candidate user account, remove the device from the subset of devices; and in response to determining that all devices have been removed from the subset of devices, remove the candidate user account from the list of candidate user account suspected of being engaged in broadband internet access sharing.

20. The system of claim 17, wherein the control circuitry is further configured to:

determine that a range extender is connected to the user equipment device; and momentarily deactivate the range extender;

wherein the second time is during the time when the range extender is deactivated.

21. The system of claim 13, wherein the control circuitry is further configured to narrow the list of candidate user accounts suspected of being engaged in broadband internet access sharing by:

identifying, using the input/output circuitry, a plurality of devices connected, via Wi-Fi, to the respective user equipment device associated with a candidate user account;

identifying a subset of devices of the plurality of devices having a Wi-Fi signal strength below a threshold signal strength;

for each respective device of the subset of devices:
   determining whether the respective device has connected to a network to which access is restricted to subscribers by a provider of the network; and
   in response to determining that the respective device has connected to the network, removing the respective device from the subset of devices; and in response to determining that all devices have been removed from the subset of devices, removing the candidate user account from the list of candidate user account suspected of being engaged in broadband internet access sharing.

22. The system of claim 13, wherein the control circuitry is further configured to narrow the list of candidate user accounts suspected of being engaged in broadband internet access sharing by:

identifying, using the input/output circuitry, a subset of devices connected, via Wi-Fi, to the respective user equipment device associated with a candidate user account, that are suspected of being engaged in broadband internet access sharing;

for each respective device of the subset of devices:
   transmitting, using the input/output circuitry, to the respective device, a request for authorization; and
   in response to receiving, using the input/output circuitry, from the respective device, a valid authorization, removing the device from the subset of devices; and in response to determining that all devices have been removed from the subset of devices, removing the candidate user account from the list of candidate user account suspected of being engaged in broadband internet access sharing.

23. The system of claim 13, wherein the control circuitry is further configured to narrow the list of candidate user accounts suspected of being engaged in broadband internet access sharing by:

identifying, using the input/output circuitry, a plurality of devices connected to the respective user equipment device associated with a candidate user account;

determining, for each device of the plurality of devices, a first connection time, wherein the first connection time is an earliest time at which the device connected for the first time, to the respective user equipment device;

identifying a first device having an earliest first connection time;

for each respective device of the plurality of devices other than the first device:
   comparing the first connection time of the respective device to the first connection time of the first device; and
   in response to determining, based on the comparing, that the first connection time of the respective device is within a threshold amount of time of the first connection time of the first device, removing the respective device from the plurality of devices; and in response to determining that all devices other than the first device have been removed from the plurality of devices, removing the candidate user account from the list of candidate user account suspected of being engaged in broadband internet access sharing.

24. The system of claim 13, wherein the control circuitry is further configured to narrow the list of candidate user accounts suspected of being engaged in broadband internet access sharing by:

identifying, using the input/output circuitry, a plurality of devices connected, via Wi-Fi, to the respective user equipment device associated with a candidate user account;

during a first time interval, temporarily deactivating an extension function of the respective user equipment device associated with the candidate user account;

retrieving data describing dimensions of least a portion of a building associated with the candidate user account;

for each respective device of the plurality of devices:
- determining, during the first time interval, a Wi-Fi signal strength of the respective device; and
- calculating, based on the signal strength of the respective device, a distance between the respective device and the respective user equipment device;

determining whether the distance between any device of the plurality of devices and the respective user equipment device exceeds the dimensions of the at least a portion of the building associated with the candidate user account; and in response to determining that the distance between every device of the plurality of devices and the respective user equipment is within the dimensions of the at least a portion of the building associated with the candidate user account, removing the candidate user account from the list of candidate user accounts suspects of being engaged in broadband internet access sharing.

* * * * *